United States Patent
Isobe et al.

(10) Patent No.: US 11,436,946 B2
(45) Date of Patent: Sep. 6, 2022

(54) ENCRYPTION DEVICE, ENCRYPTION METHOD, DECRYPTION DEVICE, AND DECRYPTION METHOD

(71) Applicants: SONY CORPORATION, Tokyo (JP); TECHNICAL UNIVERSITY OF DENMARK, Kongens Lyngby (DK)

(72) Inventors: Takanori Isobe, Tokyo (JP); Andrey Bogdanov, Kongens Lyngby (DK)

(73) Assignees: SONY CORPORATION, Tokyo (JP); TECHNICAL UNIVERSITY OF DENMARK, Kgs. Lyngby (DK)

(*) Notice: Subject to any disclaimer, the term of this patent is extended or adjusted under 35 U.S.C. 154(b) by 303 days.

(21) Appl. No.: 16/636,122

(22) PCT Filed: May 28, 2018

(86) PCT No.: PCT/JP2018/020342
§ 371 (c)(1),
(2) Date: Feb. 3, 2020

(87) PCT Pub. No.: WO2019/031026
PCT Pub. Date: Feb. 14, 2019

(65) Prior Publication Data
US 2020/0160755 A1 May 21, 2020

(30) Foreign Application Priority Data

Aug. 10, 2017 (JP) .............................. JP2017-156143

(51) Int. Cl.
H04L 29/06 (2006.01)
G09C 1/00 (2006.01)
(Continued)

(52) U.S. Cl.
CPC .............. *G09C 1/00* (2013.01); *H04L 9/0631* (2013.01); *H04L 9/0861* (2013.01); *H04L 2209/16* (2013.01)

(58) Field of Classification Search
None
See application file for complete search history.

(56) References Cited

U.S. PATENT DOCUMENTS 9,274,976 B2 *   3/2016   Farrugia ............... G06F 21/125
2006/0140401 A1 * 6/2006   Johnson ................ G06F 21/14
                                                          380/44
(Continued)

FOREIGN PATENT DOCUMENTS

JP  2012-520589 A   9/2012
JP  2017-187724 A   10/2017

OTHER PUBLICATIONS

Cui, Hui et al. Public-Key Encryption Resilient against Linear Related-Key Attacks Revisited. 2014 IEEE 13th International Conference on Trust, Security and Privacy in Computing and Communications. https://ieeexplore.ieee.org/stamp/stamp.jsp?tp=&arnumber=7011260 (Year: 2014).*

(Continued)

*Primary Examiner* — Jeremiah L Avery
(74) *Attorney, Agent, or Firm* — Paratus Law Group, PLLC

(57) ABSTRACT

There is provided an encryption device to ensure strong security without using a random number in a white-box model. The encryption device includes: an encryption part configured to encrypt an input value using a black-box model in which input/output values are able to be recognized from the outside and an intermediate value is not able to be recognized from the outside; and a key generation part configured to encrypt the input value to the encryption part to generate a cryptographic key of the encryption part using (Continued)

a white-box model in which the input/output value and the intermediate value are able to be recognized from the outside.

16 Claims, 28 Drawing Sheets

(51) Int. Cl.
*H04L 9/06* (2006.01)
*H04L 9/08* (2006.01)

(56) References Cited

U.S. PATENT DOCUMENTS

| | | | | |
|---|---|---|---|---|
| 2012/0002807 | A1* | 1/2012 | Michiels | H04L 9/002 380/28 |
| 2015/0312042 | A1* | 10/2015 | Michiels | H04L 9/3242 380/28 |
| 2015/0324302 | A1* | 11/2015 | Lee | H04L 9/08 713/193 |
| 2016/0330019 | A1 | 11/2016 | Michiels et al. | |
| 2017/0141911 | A1* | 5/2017 | Michiels | H04L 9/003 |
| 2017/0294148 | A1 | 10/2017 | Isobe et al. | |

OTHER PUBLICATIONS

Libert, Benoît; Vergnaud, Damien. Towards Practical Black-Box Accountable Authority IBE: Weak Black-Box Traceability With Short Ciphertexts and Private Keys. https://ieeexplore.ieee.org/stamp/stamp.jsp?tp=&arnumber=6034726 (Year: 2011).*

Chow et al., A White-Box DES Implementation for DRM Applications, DRM 2002, Nov. 18, 2002, pp. 1-16.

Chow et al., White-Box Cryptography and an AES Implementation, SAC 2002, Aug. 15-16, 2002, pp. 1-18.

Bogdanov et al., White-box Cryptography Revisited: Space-Hard Ciphers, Proceedings of the 22nd ACM SIGSAC Conference on Computer and Communications Security, Oct. 12, 2015, pp. 1058-1069.

Fouque et al., Efficient and Provable White-Box Primitives, ASIACRYPT 2016, Dec. 4-8, 2016, pp. 1-30.

Andrew C. Yao, Theory and Applications of Trapdoor Functions, 23rd Annual Symposium on Foundations of Computer Science (sfcs 1982), Nov. 3-5, 1982, pp. 80-91, IEEE.

Andrey Bogdanov et at., Towards Practical Whitebox Cryptography: Optimizing Efficiency and Space Hardness, International Association for Cryptologic Research, Nov. 9, 2016, pp. 126-158.

* cited by examiner

|  | ENTIRE CONFIGURATION | TYPE OF F FUNCTION/ S FUNCTION | WHETHER Table size CAN BE CHANGED |
|---|---|---|---|
| CONFIGURATION B | Feistel | 1 | No |
| CONFIGURATION C | SPN | 1 | No |
| CONFIGURATION D | Feistel | MULTIPLE | Yes |
| CONFIGURATION E | SPN | MULTIPLE | Yes |

FIG.20
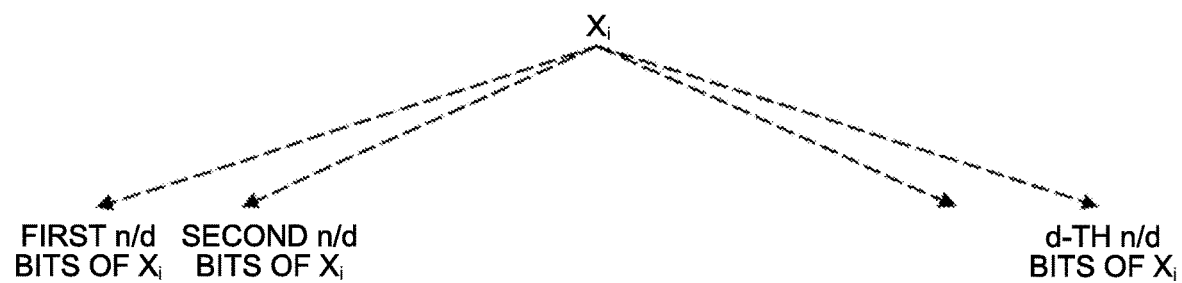
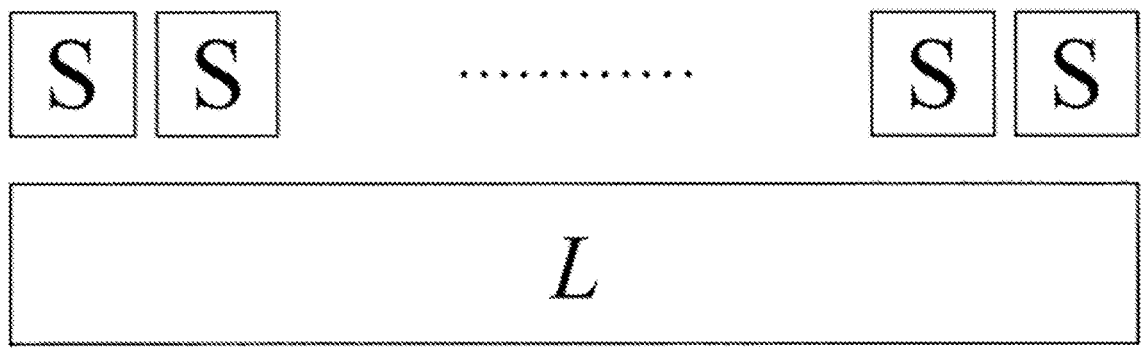
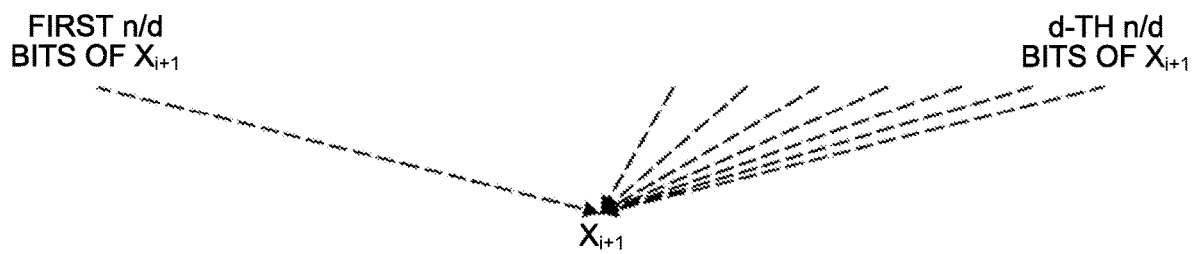

FIG.22
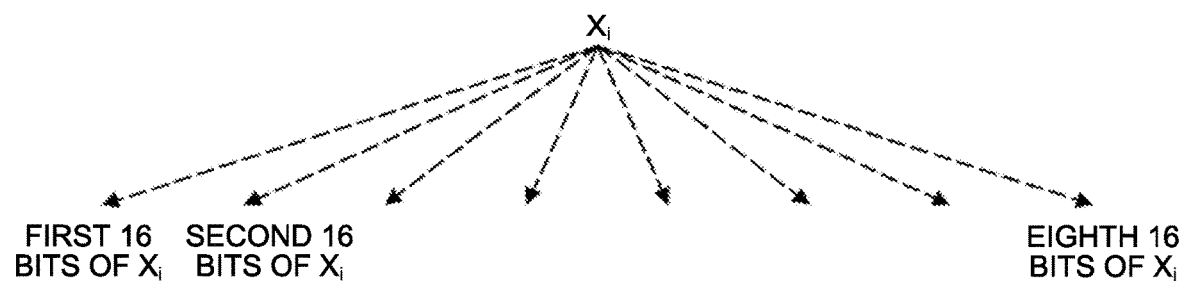
S FUNCTION
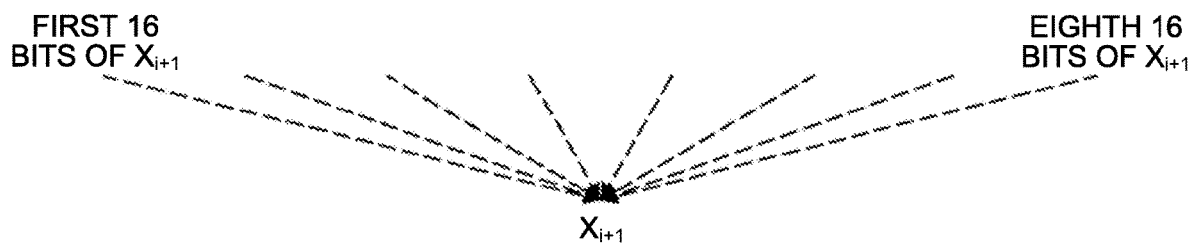

FIRST F FUNCTION (INPUT n/d bits, OUTPUT n - n/d bits)
SECOND F FUNCTION (INPUT 2n/d bits, OUTPUT n - 2n/d bits)
THIRD F FUNCTION (INPUT 3n/d bits, OUTPUT n - 3n/d bits)
FOURTH F FUNCTION (INPUT 4n/d bits, OUTPUT n - 4n/d bits)

ENCRYPTION DEVICE, ENCRYPTION METHOD, DECRYPTION DEVICE, AND DECRYPTION METHOD

CROSS REFERENCE TO PRIOR APPLICATION

This application is a National Stage Patent Application of PCT International Patent Application No. PCT/JP2018/020342 (filed on May 28, 2018) under 35 U.S.C. § 371, which claims priority to Japanese Patent Application No. 2017-156143 (filed on Aug. 10, 2017), which are all hereby incorporated by reference in their entirety.

FIELD

The present disclosure relates to an encryption device, an encryption method, a decryption device, and a decryption method.

BACKGROUND

In the related art, for example, the following Non Patent Literatures 1 and 2 disclose methods of converting an existing block cipher to be secure in a white-box model. The methods described in Non Patent Literatures 1 and 2 relate to a technique of guaranteeing security even if internal arithmetic operation is viewed from the outside by converting an arithmetic operation into a large table lookup and embedding a secret key in the table, regarding white-box implementation of an existing algorithm (DES, AES).

In the methods disclosed in Non Patent Literatures 1 and 2, a value of the secret key is included in the table, so that a table with a key is generated. To enhance security of each table, a secret non-linear function is added to the front and the rear of the table. To the front and the rear of an encryption algorithm E, a function IN and a function OUT are added as external encoding.

The following Non Patent Literatures 3 and 4 disclose techniques of changing a cryptographic key for each piece of encryption processing by using a key generation function that is secure in the white-box model.

CITATION LIST

Non Patent Literature

Non Patent Literature 1: S. Chow, P. Eisen, H. Johnson, P. C. van Oorschot "A white-box DESimplementation for DRM applications." DRM 2002
Non Patent Literature 2: S. Chow, P. Eisen, H. Johnson, P. C. van Oorschot "White-BoxCryptography and an AES Implementation?" SAC 2002
Non Patent Literature 3: A. Bogdanov and T. Isobe, "White-box Cryptgraphy Revisited: Space-hard Cipher", ACM CCS 2015
Non Patent Literature 4: P-A Fouque and P. Karpman and P. Kirchner and B. Minaud, "Efficientand Provable White-Box Primitives" ASIACRYPT2016

SUMMARY

Technical Problem

However, in the methods disclosed in Non Patent Literatures 1 and 2, there is the problem that a new function is required to be added to an input/output of an encryption function E as external encoding to enhance security, and the security is largely decreased if external encoding is eliminated. Additionally, the encryption function is caused to be different from the original encryption function E. Additionally, even if external encoding is added, there has been provided a practical attack method.

More specifically, the technique disclosed in Non Patent Literatures 1 and 2 is a white-box technique for the AES and the DES, but in a case of using external encoding, encryption in the white-box model becomes a different encryption algorithm. Due to this, it cannot be said that the technique is white-box implementation for the AES in a strict sense, and a different encryption algorithm is implemented in essence. Additionally, at the time of decoding encoded plaintext, work is required for decoding plaintext that is encoded in another secure domain in the same device into normal plaintext. That is, a region in which an arithmetic operation can be securely performed is required in an environment requiring white-box implementation, which contradicts with the white-box model, and there is the problem that an application is limited. In a case of not using external encoding, external encoding cannot be used in part of the first and the last rounds, so that there is the problem that the security is largely decreased. Even if external encoding is added, there has been provided a practical attack method.

In the method disclosed in Non Patent Literature 3, a cipher is designed to be secure in the white-box model, but it is difficult to guarantee strong security (indistinguishability) in a case in which part of information is leaked, and it is not possible to guarantee that information of plaintext is not leaked from the encryption function. In the method disclosed in Non Patent Literature 4, a random number is required to guarantee the security in the white-box model. However, in the white-box model, an attacker is assumed to be able to freely control a random number source, so that the security is difficult to be guaranteed.

As described above, all of the techniques disclosed in Non Patent Literatures 1 to 4 are secure for a black-box model, but in the techniques disclosed in Non Patent Literatures 1 and 2, a cryptographic key may be recovered in the white-box model, which cannot be said to be secure. In the techniques disclosed in Non Patent Literatures 3 and 4, there is no risk that a cryptographic key is recovered in the white-box model, but information of plaintext may be leaked in the technique disclosed in Non Patent Literature 3, which cannot be said to be secure. In the technique disclosed in Non Patent Literature 4, a random number is required although there is no risk of leakage of the information of plaintext, and the attacker can freely control the random number source in the white-box model as described above, so that the security cannot be ensured.

Accordingly, there has been a demand for ensuring strong security without using a random number in the white-box model.

Solution to Problem

According to the present disclosure, an encryption device is provided that includes:
an encryption part configured to encrypt an input value using a black-box model in which input/output values are able to be recognized from the outside and an intermediate value is not able to be recognized from the outside; and
a key generation part configured to encrypt the input value to the encryption part to generate a cryptographic key of the encryption part using a white-box model in which the input/output values and the intermediate value are able to be recognized from the outside.

Moreover, according to the present disclosure, an encryption method is provided that includes:

encrypting an input value using a cryptographic key in a black-box model in which input/output values are able to be recognized from the outside and an intermediate value is not able to be recognized from the outside; and encrypting the input value to generate the cryptographic key using a white-box model in which the input/output value and the intermediate value are able to be recognized from the outside.

Moreover, according to the present disclosure, a decryption device is provided that configured to perform decryption by an inverse operation of encryption processing, the encryption processing performed by an encryption part configured to encrypt an input value using a black-box model in which input/output values are able to be recognized from the outside and an intermediate value is not able to be recognized from the outside, and a key generation part configured to encrypt the input value to the encryption part to generate a cryptographic key of the encryption part using a white-box model in which the input/output value and the intermediate value are able to be recognized from the outside.

Moreover, according to the present disclosure, a decryption method for performing decryption by an inverse operation of encryption processing is provided, the encryption processing includes: encrypting an input value using a cryptographic key in a black-box model in which input/output values are able to be recognized from the outside and an intermediate value is not able to be recognized from the outside; and encrypting the input value to generate the cryptographic key using a white-box model in which the input/output value and the intermediate value are able to be recognized from the outside.

Advantageous Effects of Invention

As described above, according to the present disclosure, it becomes possible to ensure strong security without using a random number in the white-box model.

The effects described above are not limitations, and any of the effects disclosed herein or another effect that may be grasped from the present description may be exhibited in addition to the effects described above, or in place of the effects described above.

BRIEF DESCRIPTION OF DRAWINGS

FIG. 20 is a schematic diagram illustrating the specific example (C).

FIG. 22 is a schematic diagram illustrating a case in which n=128 and d=8 in FIG. 18.

DESCRIPTION OF EMBODIMENTS

Figure 1:
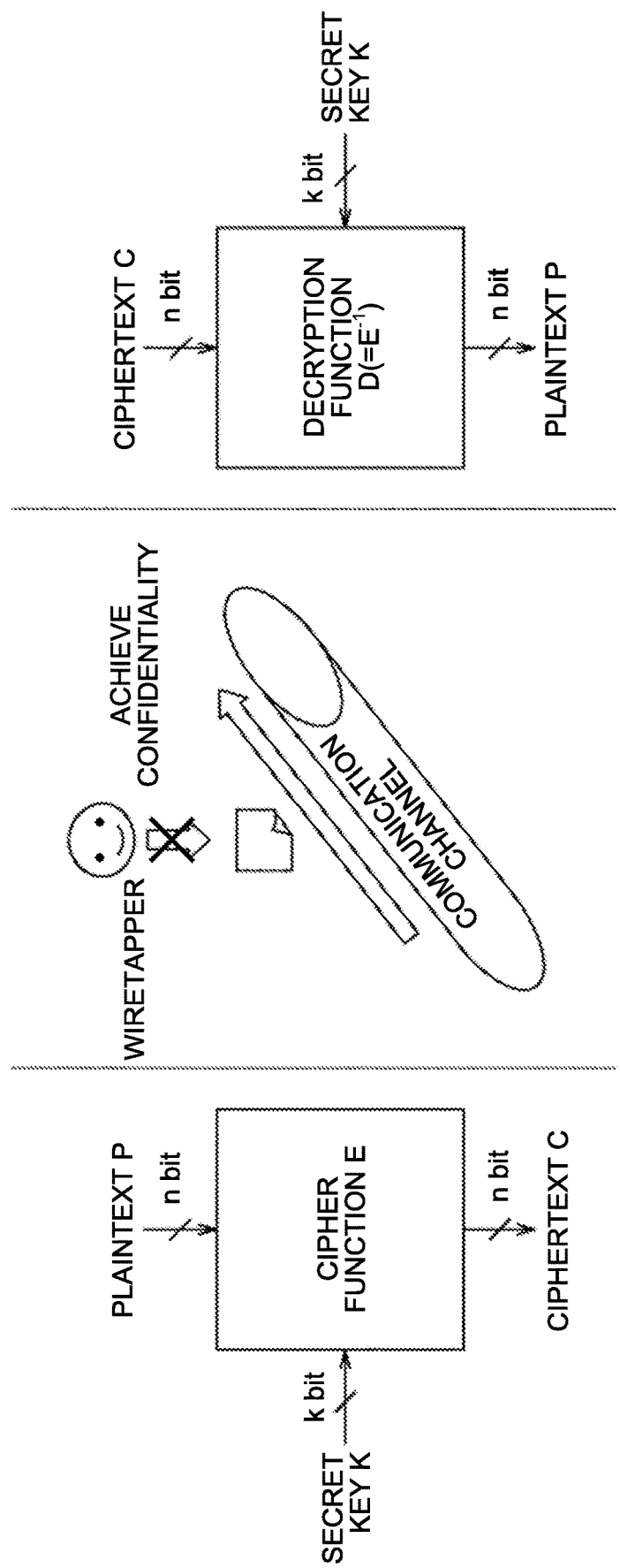
FIG. 1 is a schematic diagram illustrating a common key block cipher.

The following describes a preferred embodiment of the present disclosure in detail with reference to the attached drawings. In the present description and the drawings, constituent elements having substantially the same functional configuration are denoted by the same reference numeral, and redundant description will not be repeated.

The description will be made in the following order.

1. Regarding common key block cipher technique

2. Configuration of encryption device according to embodiment

3. Regarding block cipher of white-box model
4. Specific configuration example
4.1. Specific example (B)
4.2. Specific example (C)
4.3. Specific example (D)
4.4. Specific example (E)
5. Configuration example for decryption
6. Difference from existing technique
6.1. Difference from first existing technique
6.2. Difference from second existing technique
7. Regarding security obtained by encryption according to embodiment
8. Example of application to which embodiment is applied

1. Regarding Common Key Block Cipher Technique

There is known a common key block cipher technique that uses the same key for encryption and decryption. FIG. 1 is a schematic diagram illustrating a common key block cipher, and illustrates an n-bit common key block cipher algorithm E corresponding to a key length of k-bit. At the time of encryption, ciphertext C (n-bit) is generated from plaintext P (n-bit) with an encryption function E using a k-bit secret key K. At the time of decryption, the plaintext P (n-bit) is generated from the ciphertext C (n-bit) with a decryption function D (=E$^{-1}$) using the k-bit secret key K. With such a common key block cipher, for example, in a case in which data is transmitted to a communication channel as illustrated in FIG. 1, confidentiality of the plaintext for a wiretapper (hereinafter, also referred to as an attacker) can be achieved.

A bit length of the plaintext P and the ciphertext C is referred to as a block size, which is represented by n herein. n may be an optional integer value, and is typically determined to be one value for each block cipher algorithm in advance. A block cipher having a block length of n is referred to as an n-bit block cipher in some cases. The bit length of the secret key K is represented by k, and the bit length k of the key may be an optional integer value. The common key block cipher algorithm corresponds to one or a plurality of key sizes. For example, a configuration may be such that a certain block cipher algorithm A has a block size of n=128, and corresponds to the key size of k=128, k=192, or k=256.

A decryption algorithm D corresponding to the encryption algorithm E can be defined as an inverse function E$^{-1}$ of the encryption algorithm E, receives the ciphertext C and the key K as an input, and outputs the plaintext P.

Figure 2:
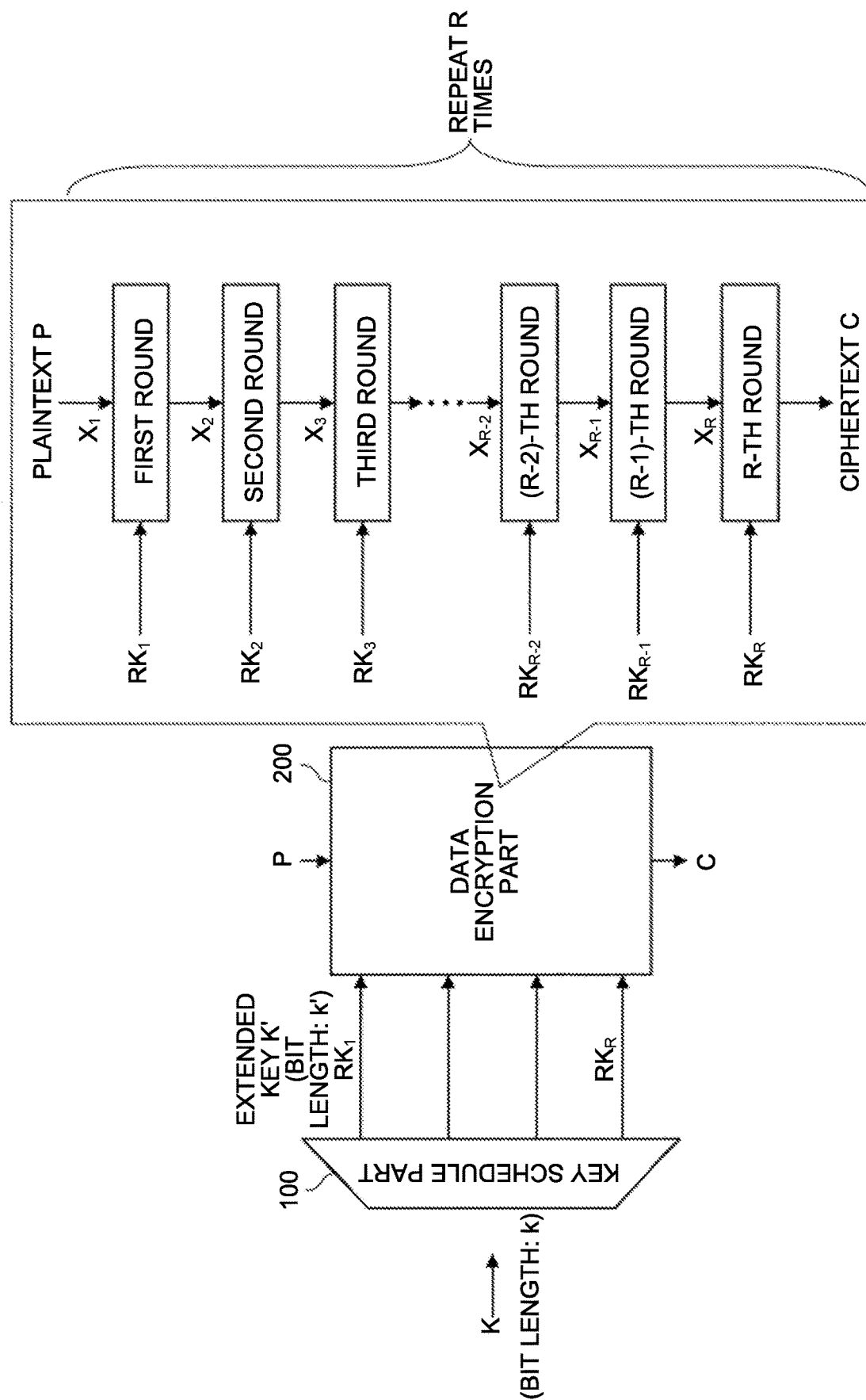
FIG. 2 is a schematic diagram illustrating an internal configuration of a block (encryption function E) for performing encryption.

FIG. 2 is a schematic diagram illustrating an internal configuration of a block (encryption function E) for performing encryption. The encryption function E is constituted of a key schedule part 100 and a data encryption part 200. The key schedule part 100 receives the secret key K as an input, and outputs an extended key K' (bit length k') obtained by extending the bit length through a certain determined step. The data encryption part 200 receives the plaintext P, receives the extended key K' that has been extended from the key schedule part, and converts data to output the ciphertext C. The data encryption part 200 performs encryption by repeatedly processing a round function obtained from the extended key K'.

It is assumed that the data encryption part 200 can be divided into round functions as processing units. The round function receives two pieces of data as an input, processes the pieces of data inside itself, and outputs one piece of data. One of the pieces of input data is n-bit data during the process of encryption, and an output of the round function in a certain round is supplied thereto as an input for the next round function. The other one of the pieces of input data is data of part of the extended key K' output from the key schedule part 100, and this key data is referred to as a round key. The total number of round functions is referred to as a total round number. The total round number is a value that is determined in advance for each encryption algorithm. Herein, the total round number is represented by R. Assuming that input data in the first round from an input side of the data encryption part 200 is X$_1$, data input to the i-th round function is Xi, and the round key is RKi, the configuration of the data encryption part 200 is represented as in FIG. 2.

The round function may take various forms in accordance with the block cipher algorithm. The round function can be classified in accordance with a structure employed by the cipher algorithm. As representative structures, an SPN structure, a Feistel structure, and an extended Feistel structure are exemplified herein.

Figure 3:
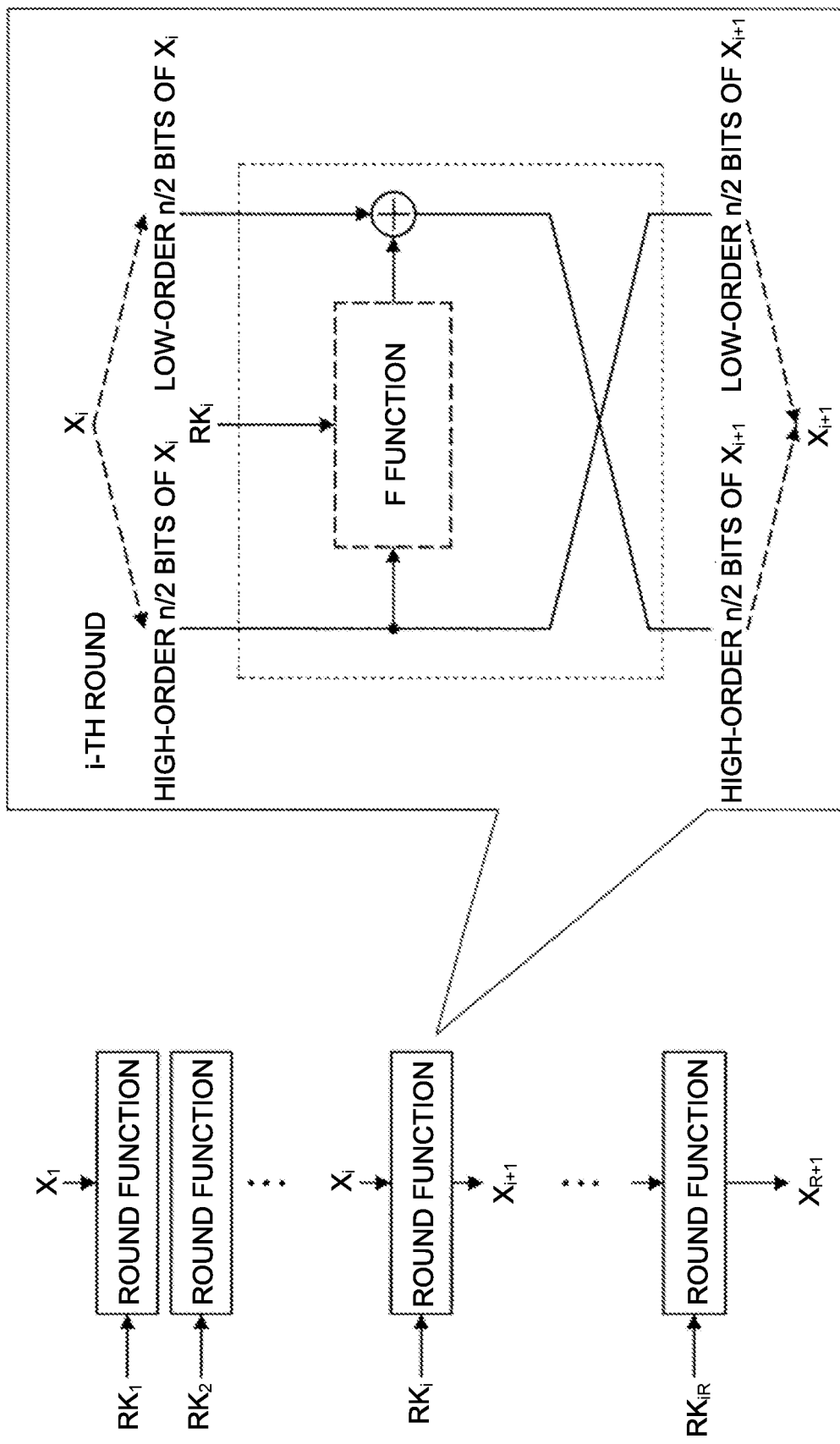
FIG. 3 is a schematic diagram illustrating a Feistel structure.
Figure 4:
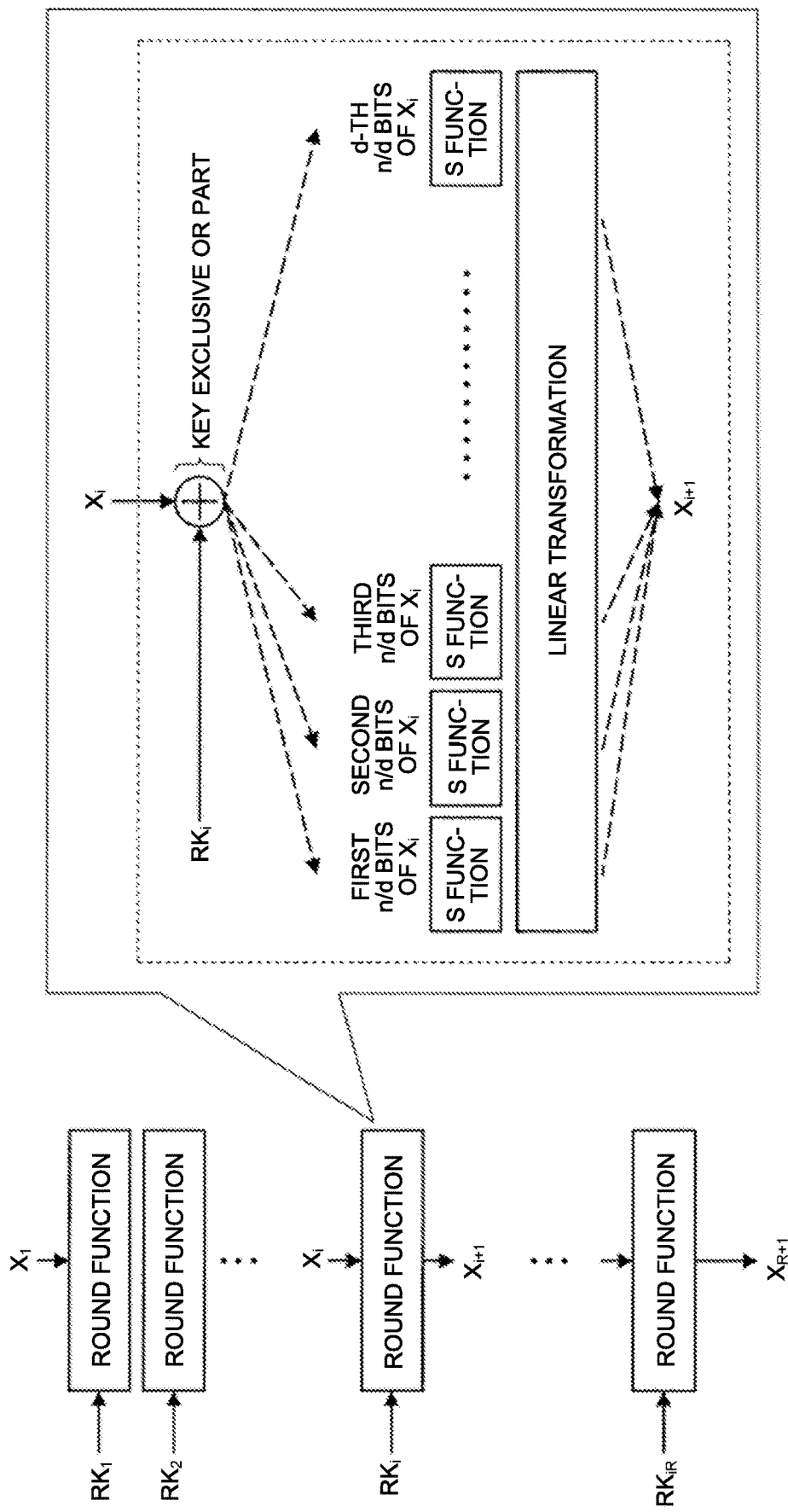
FIG. 4 is a schematic diagram illustrating an SPN structure.

FIG. 3 is a schematic diagram illustrating the Feistel structure. FIG. 4 is a schematic diagram illustrating the SPN structure. In a basic configuration example of the Feistel structure illustrated in FIG. 3, n-bit input data X$_i$ is divided into high-order n/2 bits and low-order n/2 bits for each round function, and a size of data in each line is n/2 bits. In this case, the high-order n/2 bits are input to an F function, and n/2 bits are output therefrom. This output is exclusive-ORed to the respective low-order n/2 bits. Thereafter, data in which the left part and the right part are replaced with each other is assumed to be output data X$_{i+1}$. The F function is configured based on a non-linear function. Unlike the SPN structure, the F function is not necessarily substitution. Typically, the F function is not generated from the block cipher, but generated by non-linear operation as light calculation. However, in the embodiment, the F function is generated from the block cipher.

The extended Feistel structure (generalized Feistel structure) is obtained by extending the Feistel structure to cause the number of data divisions to be three or more from two. Assuming that the number of divisions is d, various extended Feistel structures can be defined with the number of divisions d. A size of an input/output of the F function becomes relatively small, so that it is appropriate for miniaturized implementation. Additionally, each round function can have a plurality of F functions.

Figure 14:
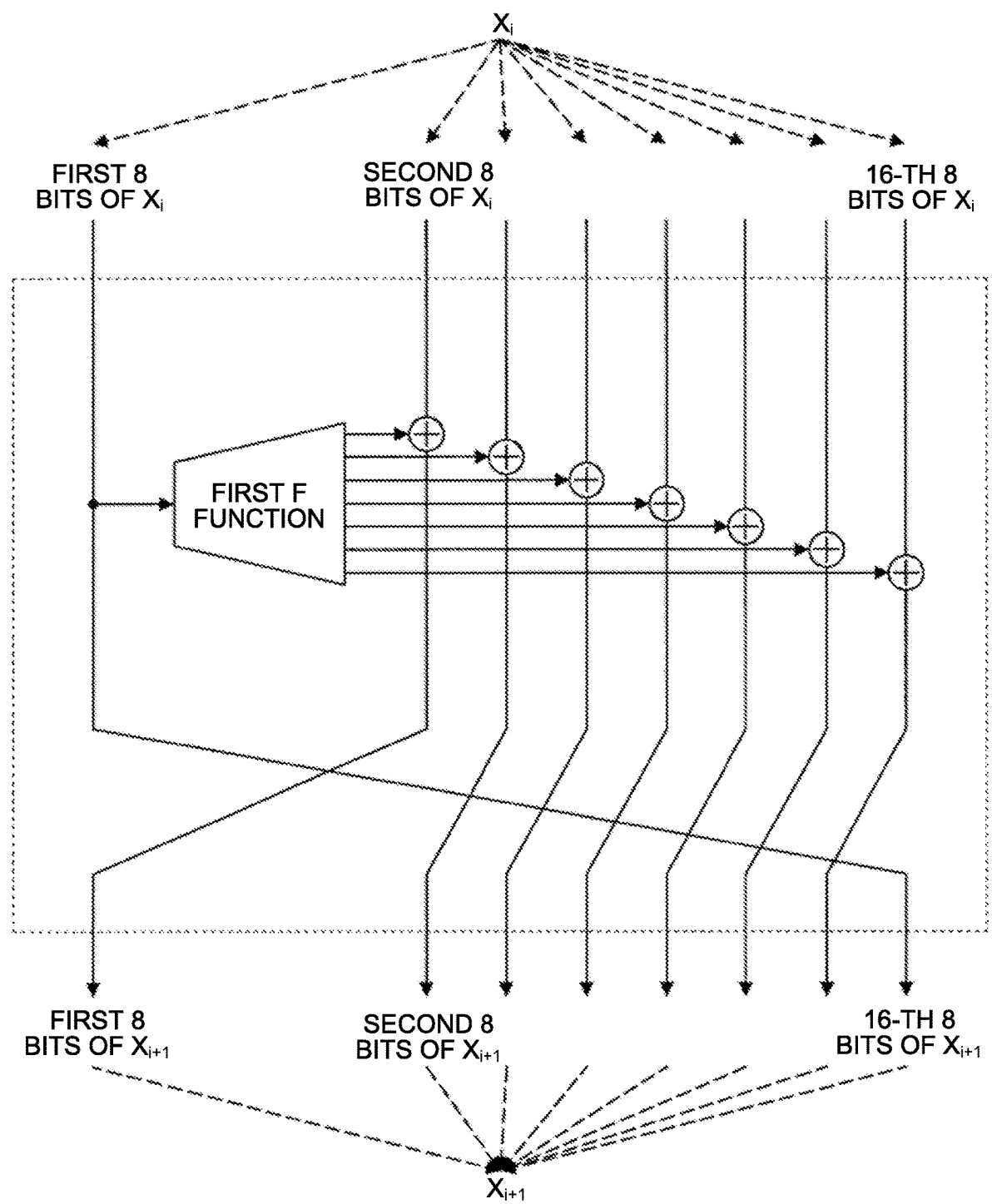
FIG. 14 is a schematic diagram illustrating the entire configuration in a case in which n=n'=128, c=1, and d=16 in FIG. 10.
Figure 17:
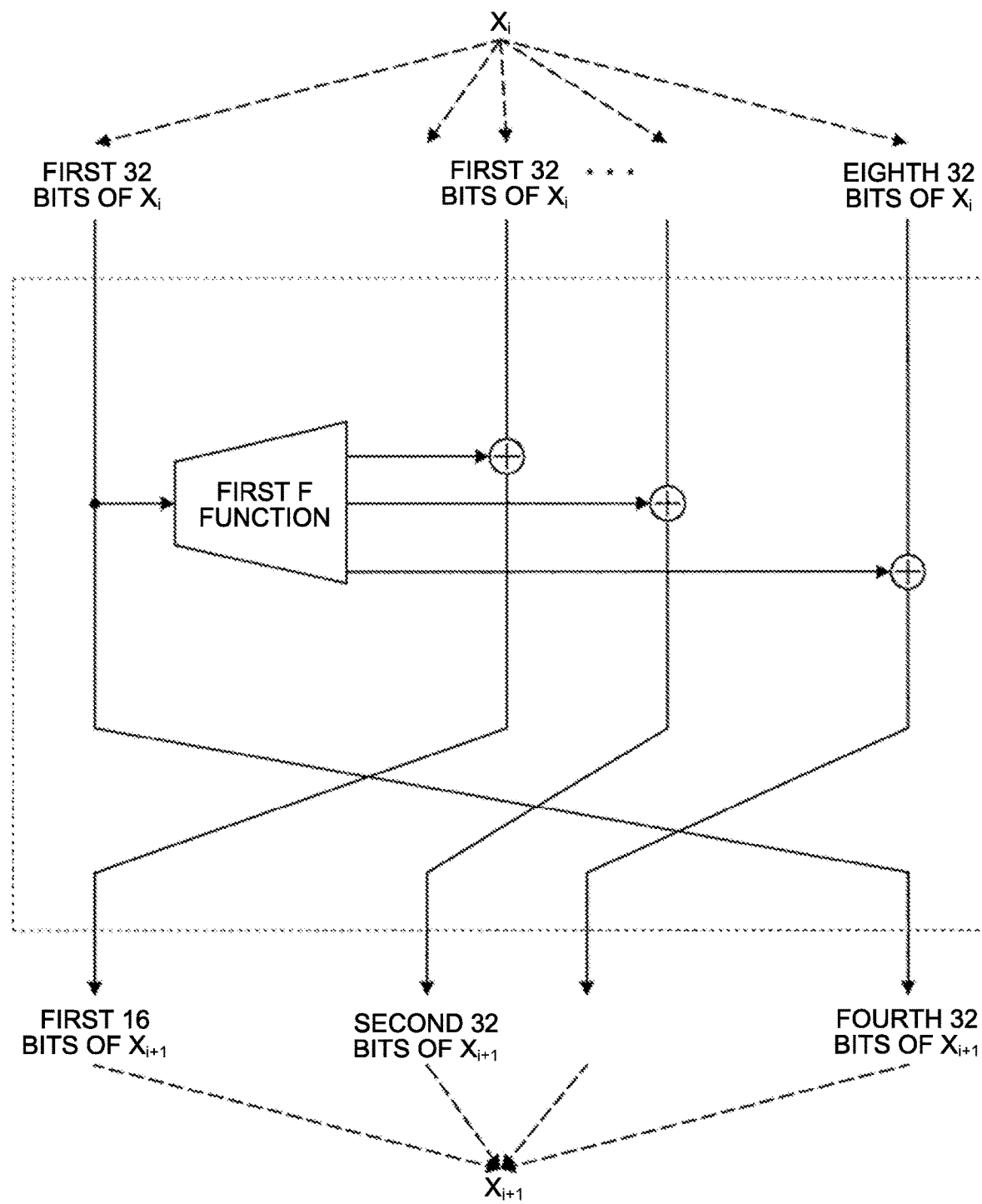
FIG. 17 is a schematic diagram illustrating the entire configuration in a case in which n=128, c=1, and d=4 in FIG. 10.

FIG. 17 (described later) illustrates an example of the extended Feistel structure in a case in which d=4 and two F functions are applied in parallel in one round. In this example, RK1$_i$ and RK2$_i$ are caused to be key inputs for a first F function and a second F function, respectively. FIG. 14 (described later) illustrates an example of the extended Feistel structure in a case in which d=8 and one F function is applied in one round. In this example, an input size to the F function is n/8 bits, an output size from the F function is 7n/8 bits, and the output is divided into seven pieces of data of n/8 bits to be exclusive-ORed to the other seven pieces of 16-bit data. It is assumed that n=128 bits.

In a basic configuration example of the SPN structure illustrated in FIG. 4, processing such as an exclusive OR operation with the round key, non-linear transformation, linear transformation, and the like are applied to all pieces of n-bit input data. A non-linear transformation part is referred to as an S-layer (Substitution-layer) and a linear transformation part is referred to as a P-layer (Permutation-layer). Each of the S-layer and the P-layer is substitution (a bijective function). In each round function, the n-bit input data Xi is divided into d sorts of data, and a size of the data in each line becomes n/d [bit]. The non-linear transformation operation is defined as an S function, and a non-linear transformation operation S-layer (Substitution-layer) of an input/output of n/d [bit] is executed for each piece of data. Thereafter, n-bit input/output linear transformation L is executed as a linear transformation P-layer (Permutation-layer). The linear transformation operation is defined as an L function.

Figure 5:
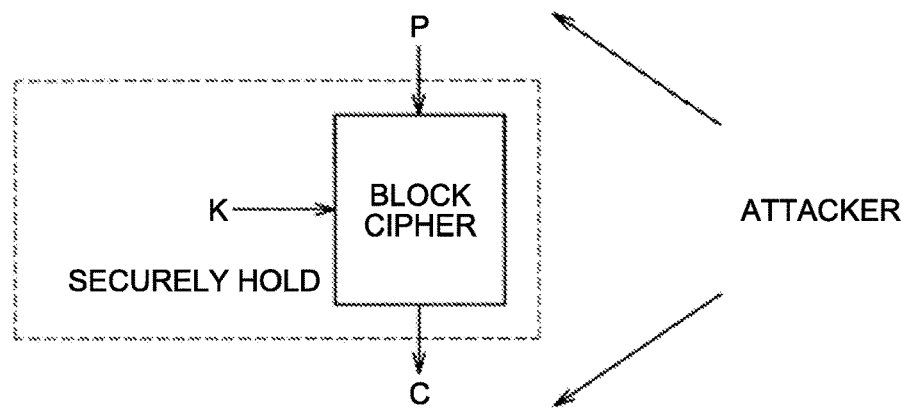
FIG. 5 is a schematic diagram illustrating a black-box model constituted of a common key block cipher.

As a security model of the block cipher, a black-box model and a white-box model can be exemplified. FIG. 5 is a schematic diagram illustrating the black-box model constituted of a common key block cipher. In the black-box model, a capacity of the attacker who wants to get the secret key can recognize and freely control input/output of the block cipher, but the attacker cannot recognize an intermediate value of the block cipher. That is, the black-box model is a security model in which the attacker can access only the plaintext P and the ciphertext C as an input and an output of the block cipher algorithm. An attack made by the attacker can be classified into a known plaintext/ciphertext attack in which the attacker knows only a value of a pair of the plaintext P and the ciphertext C, and a chosen plaintext/ciphertext attack in which the attacker can further freely control the value itself. In the black-box model, it is assumed that cipher operation itself is securely executed, and the attacker cannot see or falsify the intermediate value of the cipher. The black-box model corresponds to a case in which hardware support and the like are utilized, and tamper resistance of the cipher operation is guaranteed. A method of implementing a cipher algorithm for a black box is referred to as black-box implementation. In such a black-box model, design can be securely made so that the attacker cannot find the secret key. In the black-box model, the block cipher is designed so that the secret key K is difficult to be obtained in view of a calculation amount (resistance to a key recovery attack), and the block cipher is difficult to be distinguished from substitution with a pseudo-random key in view of a calculation amount (resistance to a distinguishing attack). A secure block cipher for the black-box model can be, for example, implemented by an encryption technique such as AES, CLEFIA, PRESENT, and Piccolo.

Figure 6:
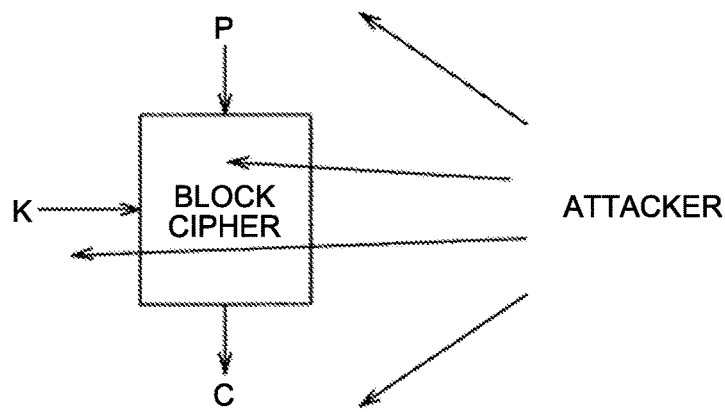
FIG. 6 is a schematic diagram illustrating a white-box model constituted of a common key block cipher.

FIG. 6 is a schematic diagram illustrating a white-box model constituted of a common key block cipher. The white-box model is a security model assuming a stronger attacker than in the black-box model, and the attacker can freely access not only the plaintext P and the ciphertext C as an input and an output of the block cipher algorithm but also the intermediate value of the arithmetic operation. In the white-box model, it is assumed that the attacker can freely control the plaintext P and the ciphertext C as an input of the block cipher, and the attacker can also see or falsify an optional intermediate value in the arithmetic operation. The white-box model corresponds to a case in which tamper resistance cannot be guaranteed due to implementation constraint such as all software without support for hardware. Additionally, the white-box model corresponds to a case in which the intermediate value is leaked due to implementation vulnerability such as buffer overflow, malware, and the like. A method of implementing a cipher algorithm for a white box is referred to as white-box implementation. With the white-box implementation, the block cipher can be configured only with software.

In this way, in the white-box model, the capacity of the attacker can recognize and freely control input/output of the block cipher, and can recognize and freely control the intermediate value of the block cipher. In the white-box model, it is required to be difficult for the attacker to obtain the key K in view of a calculation amount. Additionally, resistance to an attack directly using a code itself to be used as a large key (what is called code lifting) instead of obtaining the key K is required. The white-box model in which the attacker can recognize the intermediate value of the block cipher needs to have quantitative security against such an attack.

2. Configuration of Encryption Device According to Embodiment

Figure 7:
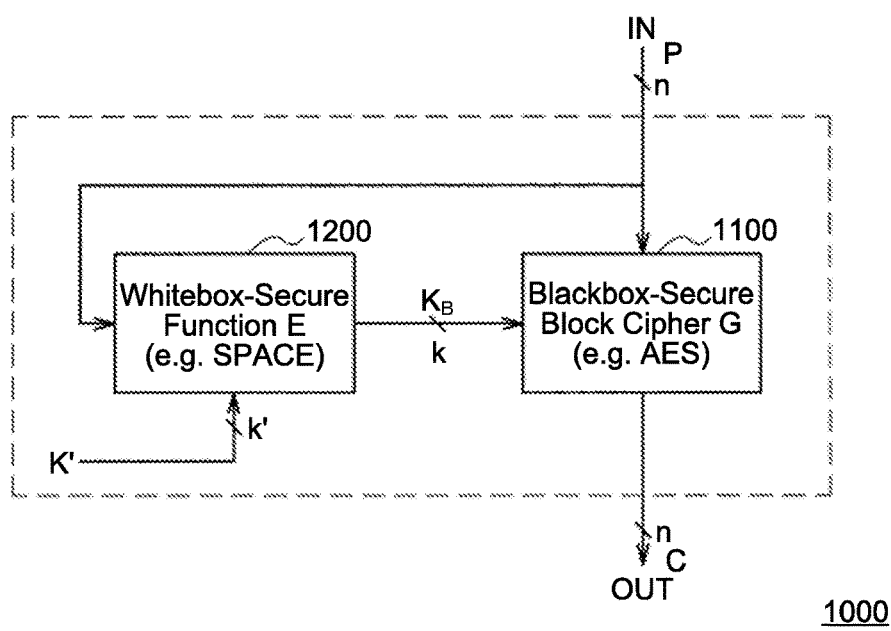
FIG. 7 is a schematic diagram illustrating a configuration of an encryption device according to an embodiment.

The embodiment relates to a scheme of protecting a cryptographic key that is secure in the black-box model described above with a cipher that is secure in the white-box model. A secret key $K_B$ of a block cipher G that is secure in the black-box model is generated from the block cipher E that is secure in the white box by using an input to the block cipher G. FIG. 7 is a schematic diagram illustrating a configuration of an encryption device 1000 according to the embodiment.

As illustrated in FIG. 7, the encryption device 1000 includes an encryption part 1100 and a key generation part 1200. The encryption part 1100 performs encryption with the block cipher G that is secure in the black-box model, and implemented by an encryption technique such as AES (AES-128/192/256), CLEFIA, PRESENT, and Piccolo, for example. The encryption part 1100 is secure in the black-box model, and is secure against an attack for key recovery or key distinction. The encryption part 1100 receives an input of n-bit plaintext P, encrypts the plaintext P using a k-bit cryptographic key $K_B$, and outputs n-bit ciphertext C.

The key generation part 1200 generates the cryptographic key $K_B$ by performing encryption with the block cipher E that is secure in the white-box model. The key generation part 1200 receives an input of the n-bit plaintext P, and generates the cryptographic key $K_B$ with a k'-bit cryptographic key K'. As described above, the cryptographic key $K_B$ is used for encryption of the plaintext P performed by the encryption part 1100. The key generation part 1200 uses the block cipher E that is secure in the white-box model, so that the key generation part 1200 is secure against a key derivation attack or decomposition of a table. The key generation part 1200 generates the cryptographic key $K_B$ with the block cipher E that is secure in the white-box model, so that the key generation part 1200 has an incompressible characteristic. Alternatively, the key generation part 1200 may generate the cryptographic key $K_B$ by receiving an input of a count value instead of the plaintext P.

Figure 8:
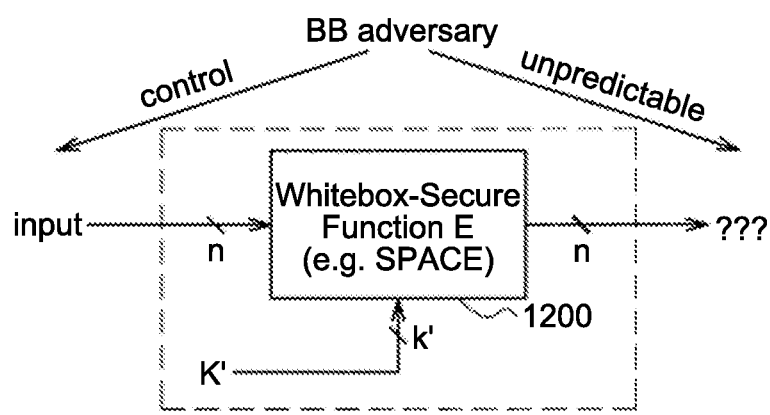
FIG. 8 is a schematic diagram illustrating unpredictability of a key generation part.

The key generation part 1200 also has a characteristic of unpredictability such that the attacker in the black-box model cannot predict an output value (cryptographic key $K_B$). FIG. 8 is a schematic diagram illustrating unpredictability of the key generation part 1200. "Unpredictability" means that, when an input is given to the function F, a value of an output cannot be obtained with higher probability than that of random estimation. For example, it means that, when an input of 128-bit plaintext P is given to the function F, a value of the output (ciphertext C) cannot be predicted with higher probability than $2^{-128}$ as illustrated in FIG. 8. That is, in a case in which the function F has unpredictability, even when the input is given thereto, the output cannot be obtained unless the cryptographic key is found.

With the configuration described above, the security can be concluded to be a cipher that is secure in the black-box model (for example, the AES) for both of the black-box model and the white-box model. The cryptographic key $K_B$ of the block cipher G that is secure in the black-box model is not leaked to the attacker due to the unpredictability of the key generation part 1200, so that the security of the block cipher G is maintained. For example, if the block cipher G is the AES, the encryption device 1000 has the security of the AES. As described later, the security of the block cipher E that is secure in the white-box model depends on the security of the AES in a case in which the block cipher E is configured with the AES. Thus, the security can be concluded to be a cipher that is secure in the black-box model for both of the black-box model and the white-box model. Additionally, a versatile encryption scheme such as the AES that is secure in the black-box model is enabled to be a more secure encryption scheme.

If part of the code is leaked, strong security (indistinguishability) can be maintained. As long as the block cipher E that is secure in the white-box model satisfies the unpredictability, the indistinguishability in the black-box model can be maintained. The "indistinguishability" means that a certain function f cannot be discriminated from a random function. In security certification for an encryption function or authentication, it is assumed that a function of a constituent element has the indistinguishability, and the security cannot be guaranteed in a case in which the function does not have the indistinguishability. Additionally, in a case in which the function does not have the indistinguishability, it cannot be guaranteed that the information of the plaintext is not leaked.

3. Regarding Block Cipher of White-Box Model

The following describes the block cipher E that is secure in the white-box model described above in detail. Specifically, the following describes a technique of securely performing cipher decryption and a technique of protecting the secret key in an unreliable execution environment. As the unreliable environment, exemplified are a case in which the secret key cannot be securely kept, and a case in which the attacker can recognize the intermediate value of the cipher operation. The block cipher G that is secure in the black-box model can be implemented by the encryption technique such as the AES as described above.

Figure 9:
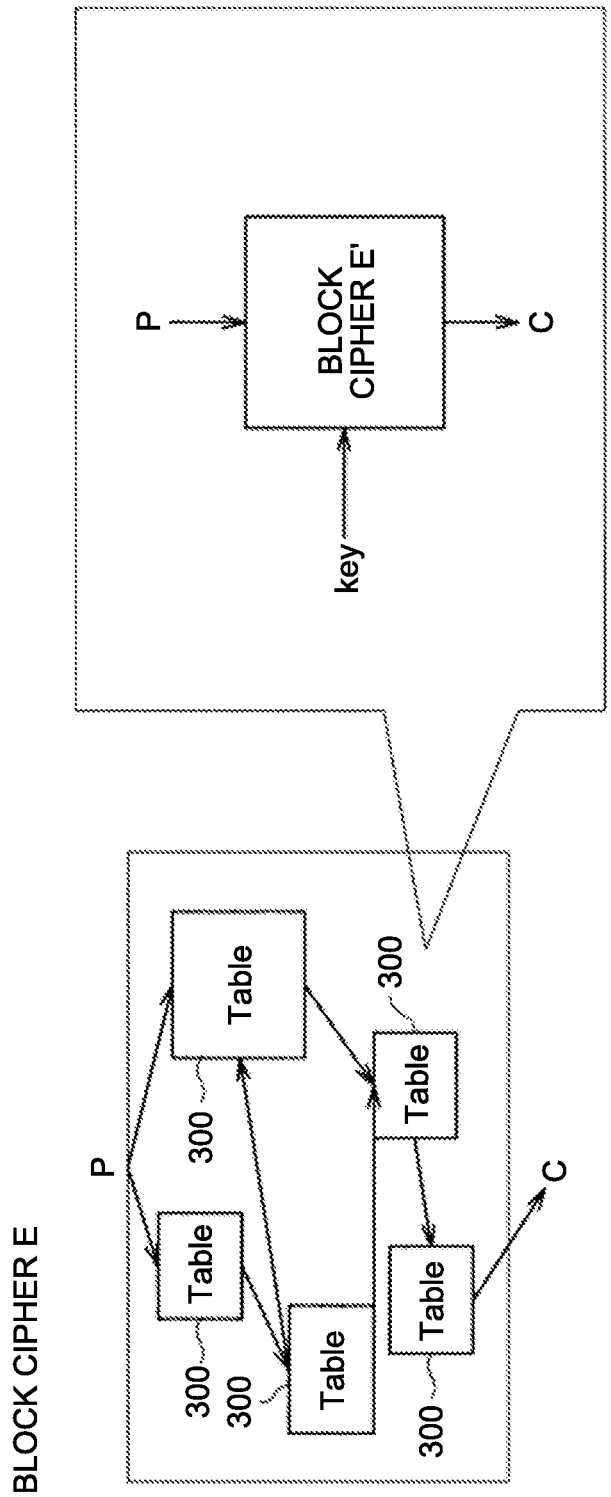
FIG. 9 is a schematic diagram illustrating an outline of an encryption technique according to the embodiment.

FIG. 9 is a schematic diagram illustrating an outline of the encryption technique for the block cipher E according to the embodiment, and illustrates an encryption device according to a basic configuration example (A). The block cipher E is configured with a plurality of tables 300, and each table is configured as a block cipher E' (internal block cipher) that is secure in the black-box model. Due to this, the secure block cipher E can be configured. In the white-box implementation, part or all of components constituted of the block cipher E' are tabulated to be implemented. An algorithm for the block cipher E' can be freely selected by the user. The encryption device can be configured with a central processing unit such as a CPU, and a computer program for causing the central processing unit to function. In this case, the computer program can be stored in a recording medium such as a memory included in the encryption device. The tables constituting the block cipher can be stored in the recording medium included in the encryption device.

In this way, in the basic configuration example (A) of the block cipher E according to the embodiment, the block cipher E that is secure in the white-box model is configured with the block cipher E' that is secure in the black-box model as a constituent element (component). The algorithm of the internal block cipher E' can be freely selected by the user, and received as an input. In the white-box implementation, a function based on the internal block cipher E' is caused to depend on a key, and part or all of the functions are implemented as a table. That is, the internal block cipher E' is generated to be tabulated with the extended key K' output from the key schedule part 100. Through the tabulation, confidentiality of the key can be largely enhanced as compared with a case in which an encryption operation is performed each time.

As a specific example (B) of the configuration example (A), the block cipher E has the Feistel structure and is constituted of F functions of one type of input/output size, and the F function is generated based on the internal block cipher E'. In this case, the F function is converted from E' by fixing part of the input of the internal block cipher E' and disregarding part of the output thereof. In the white-box implementation, all of the F functions are implemented as a table.

As a specific example (C) of the configuration example (A), the block cipher E has the SPN structure and is constituted of S functions of one type of input/output size, and the S function is generated based on the internal block cipher E'. In this case, the S function is constituted of internal block ciphers having the same size. In the white-box implementation, all of the S functions are implemented as a table.

As a specific example (D) of the configuration example (A), the block cipher E has the extended Feistel structure and is constituted of F functions having a plurality of types of input/output size, and the F function is generated based on the internal block cipher E'. In this case, the F function is generated by fixing part of the input of the internal block cipher, and disregarding part of the output thereof. In the white-box implementation, part or all of the F functions are implemented as a table.

As a specific example (E) of the configuration example (A), the block cipher E has the SPN structure and is constituted of S functions having a plurality of types of input/output size, and the S function is generated based on the internal block cipher E'. In this case, the S function is constituted of internal block ciphers having the same size. In the white-box implementation, part or all of the S functions are implemented as a table.

Figures 10, 11:
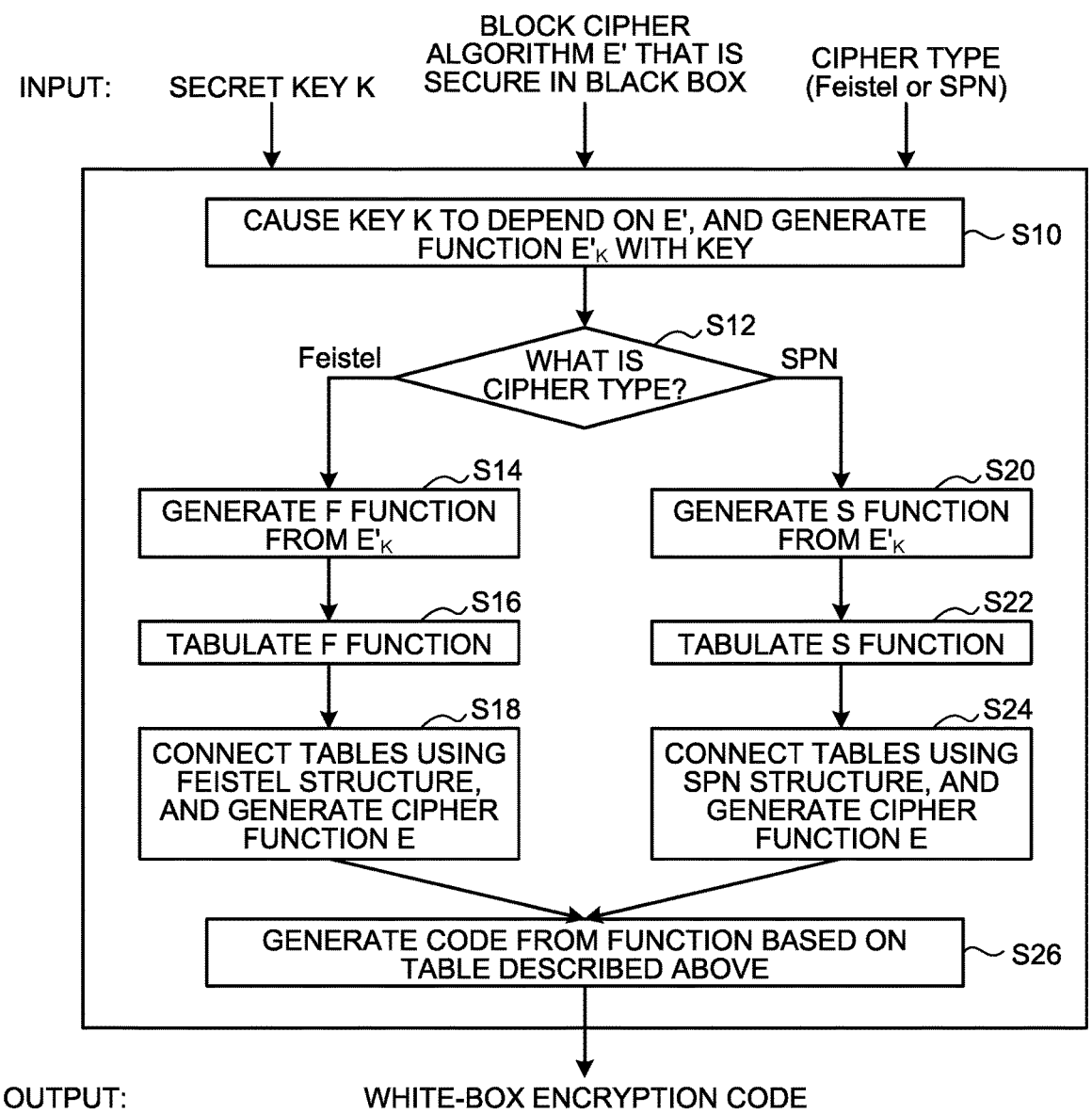
FIG. 10 is a schematic diagram illustrating the entire configuration, a type of F function/S function, and whether a table size can be changed for each of a specific example (B), a specific example (C), a specific example (D), and a specific example (E).
FIG. 11 is a flowchart illustrating processing corresponding to a cipher type.

FIG. 10 is a schematic diagram illustrating the entire configuration, the type of the F function/S function, and whether the table size can be changed for each of the specific example (B), the specific example (C), the specific example (D), and the specific example (E).

FIG. 11 is a flowchart illustrating processing corresponding to a cipher type. In FIG. 11, first, the key K is caused to depend on the internal block cipher E' at Step S10, and a function E'$_K$ with a key is generated. Next, the cipher type is determined at Step S12, and if the cipher type is the Feistel structure, the process proceeds to Step S14. At Step S14, the F function is generated from E'$_K$. Next, at Step S16, the F function is tabulated. Next, at Step S18, the tables are connected using the Feistel structure, and the cipher function E is generated.

If the cipher type is determined to be the SPN structure at Step S12, the process proceeds to Step S20, and the S function is generated from E'$_K$. Next, the S function is tabulated at Step S22. Next, at Step S24, the tables are connected using the SPN structure, and the cipher function E is generated. After Steps S18 and S24, the process proceeds to Step S26, and a code is generated from a function based on the table. Due to this, a white-box encryption code is generated.

4. Specific Configuration Example

The following describes configuration examples and effects of the specific example (B), the specific example (C), the specific example (D), and the specific example (E) in detail. Herein, it is assumed that the internal block cipher E' is an n'-bit block cipher, and is secure in the black-box model.

4.1. Specific Example (B)

Figure 12:
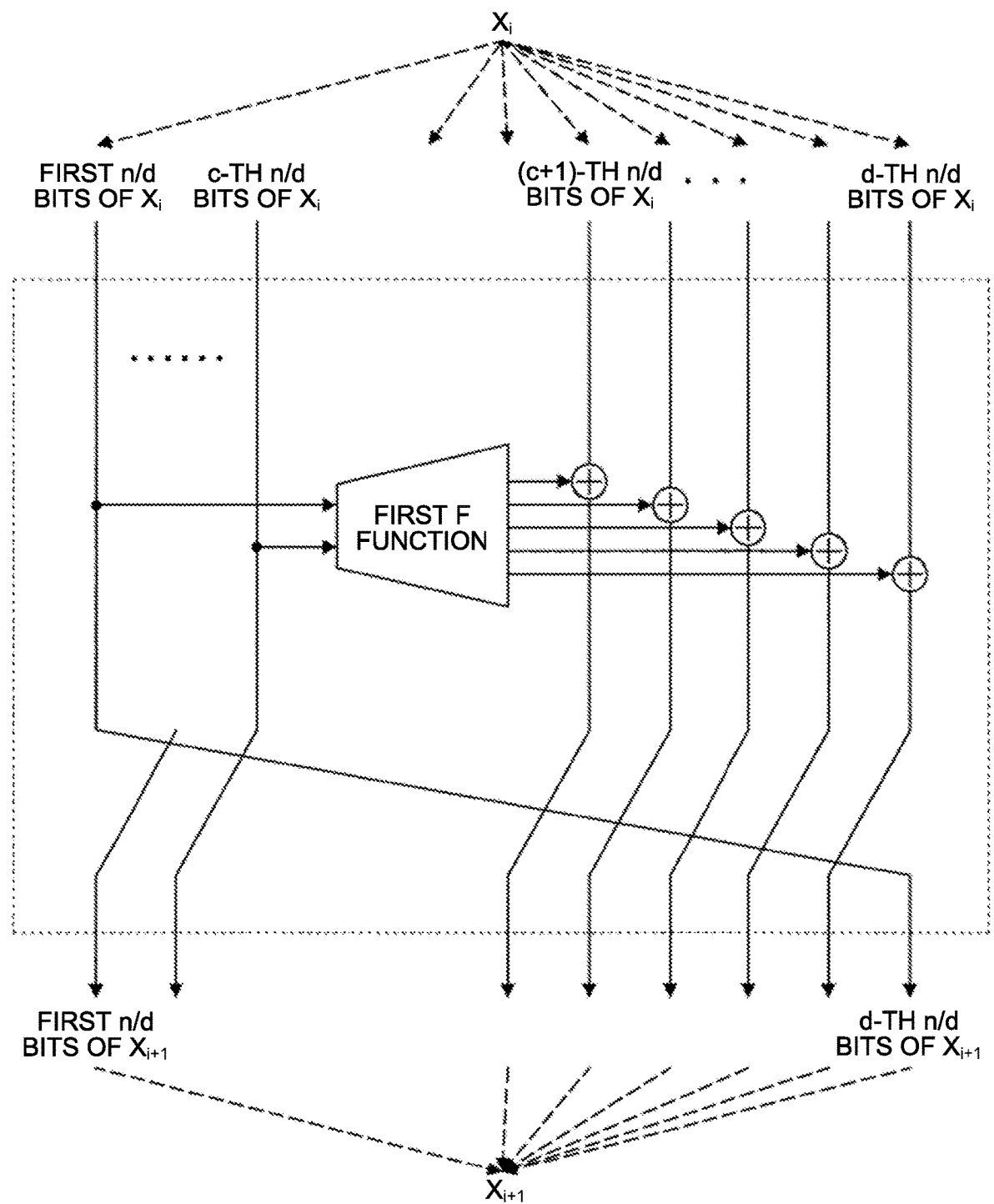
FIG. 12 is a schematic diagram illustrating the specific example (B).

FIG. 12 is a schematic diagram illustrating the specific example (B), and illustrates the configuration example using the generalized Feistel structure. In the example illustrated in FIG. 12, the n-bit input data Xi is divided into d sorts of data, and the size of the data in each line is n/d bits. In this case, data of c sorts of lines is input to the F function with an input of c×n/d bits and an output of (d−c)×(n/d) (=n−(c×n/d)) [bit], and the output is divided into d-c sorts of data of n/d [bit] to be exclusive-ORed to the other d-c sorts of lines. The F function is configured based on the internal block cipher E'. Herein, it is assumed that a block size n' of E' satisfies n'>(d−c)×(n/d) and n'>c×(n/d) (condition 1). As illustrated in FIG. 12, a value of bits input to the block cipher E' is output as a lower-order bit than a value of bits obtained through the exclusive OR.

Figure 13:
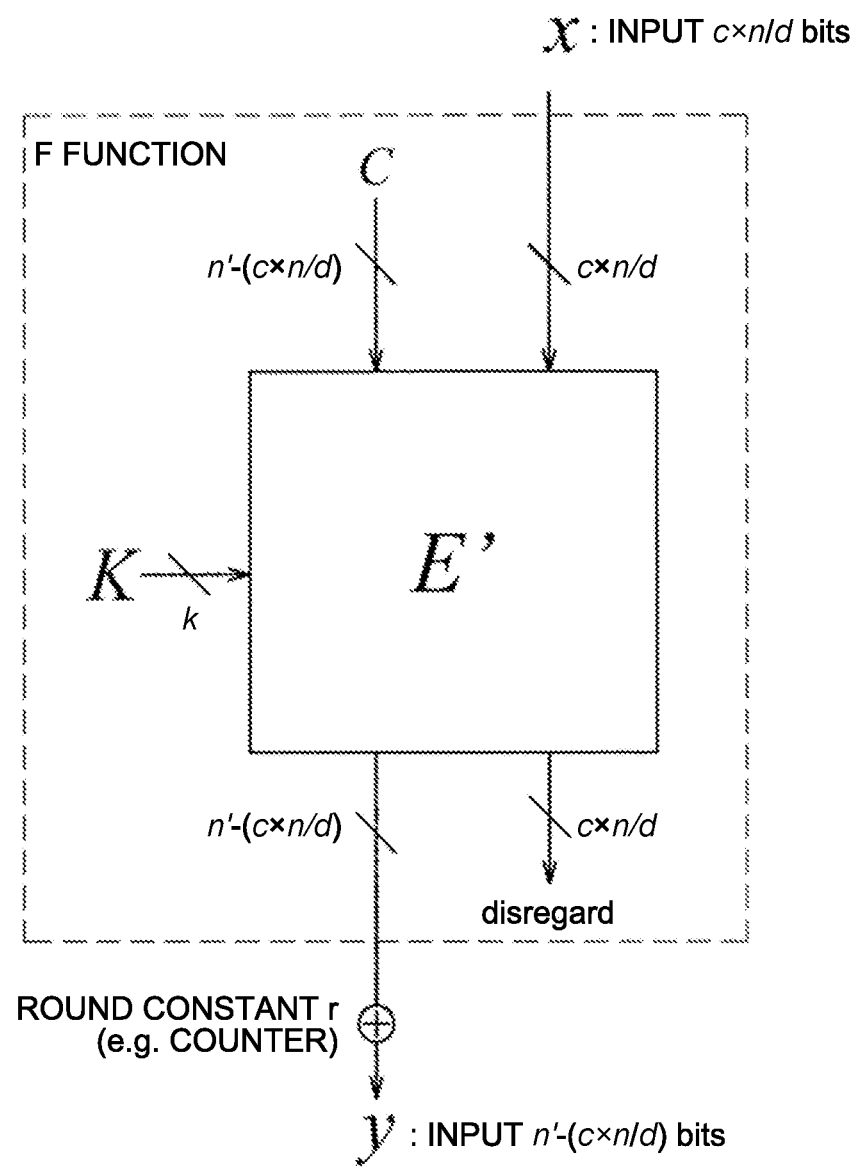
FIG. 13 is a schematic diagram illustrating a configuration of the F function.

FIG. 13 is a schematic diagram illustrating a configuration of the F function. The following describes a method of configuring the F function with the input of c×n/d [bit] and the output of (d−c)×(n/d) [bit] from the n'-bit internal block cipher E'. First, as illustrated in FIG. 13, of the input n' [bit] of the internal block cipher E', optional n'−(c×n/d) [bit] is fixed to a constant value (for example, all 0), and the input size is caused to be c×n/d. Next, optional (c×n/d) [bit] of the output is disregarded to cause the output size to be n'−(c×n/d). In this way, the F function is configured from an optional internal block cipher E' satisfying the condition 1 by fixing part of input bits and disregarding part of outputs for the internal block cipher E'. Due to tabulation, the F function is constituted of the table corresponding to n'-bit input/output. For example, in a case of 8-bit input/output, generated is a table in which an output value is associated with an input value (0 to 255). By fixing part of the input bits and disregarding part of the outputs for this table, the number of input/output bits such as 8-bit input and 120-bit output can be adjusted. In this case, to change the F function for each round, a constant specific to the round is exclusive-ORed (XORed) to the output of n'−(c×n/d) bits. For example, the constant specific to the round is assumed to be a round number, and the round number is XORed thereto. In a case in which the round number is 4, 4 is XORed thereto. However, this exclusive OR is performed after a table lookup, so that this arithmetic operation itself is not included in the table. Due to this, the F function different for each round can be represented with one sort of F function table. Thus, the F function itself of each round function can be configured in common, and a memory region for storing the table can be largely reduced.

Figure 15:
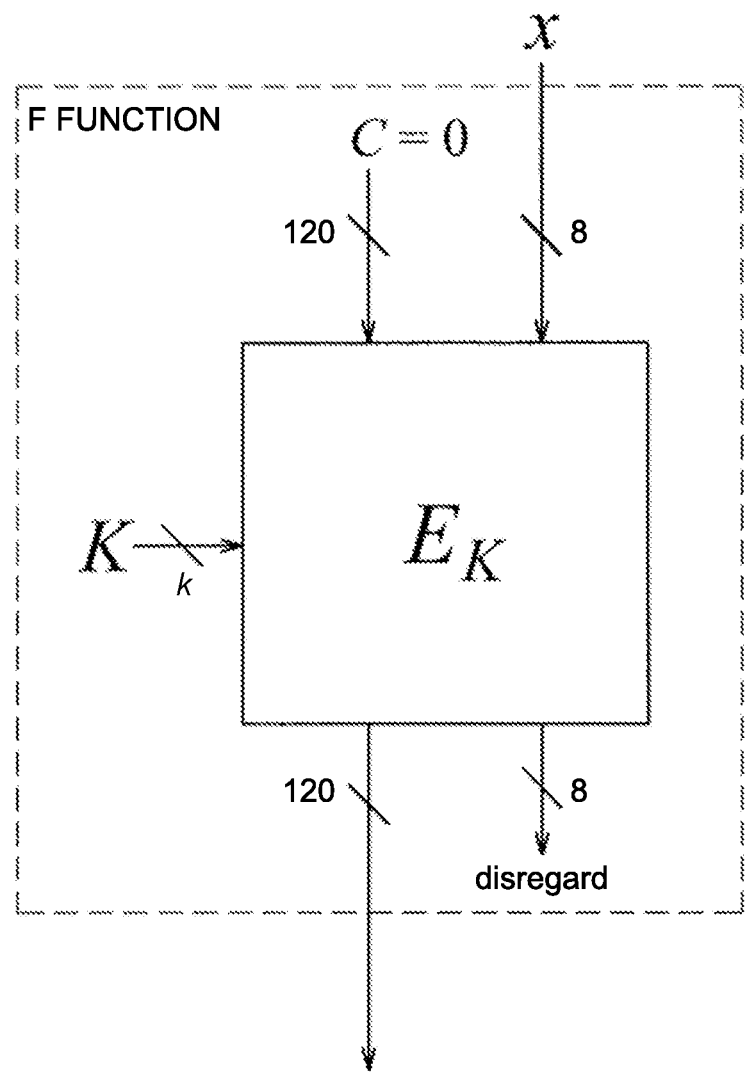
FIG. 15 illustrates a configuration of the F function in the example of FIG. 12.
Figure 16:
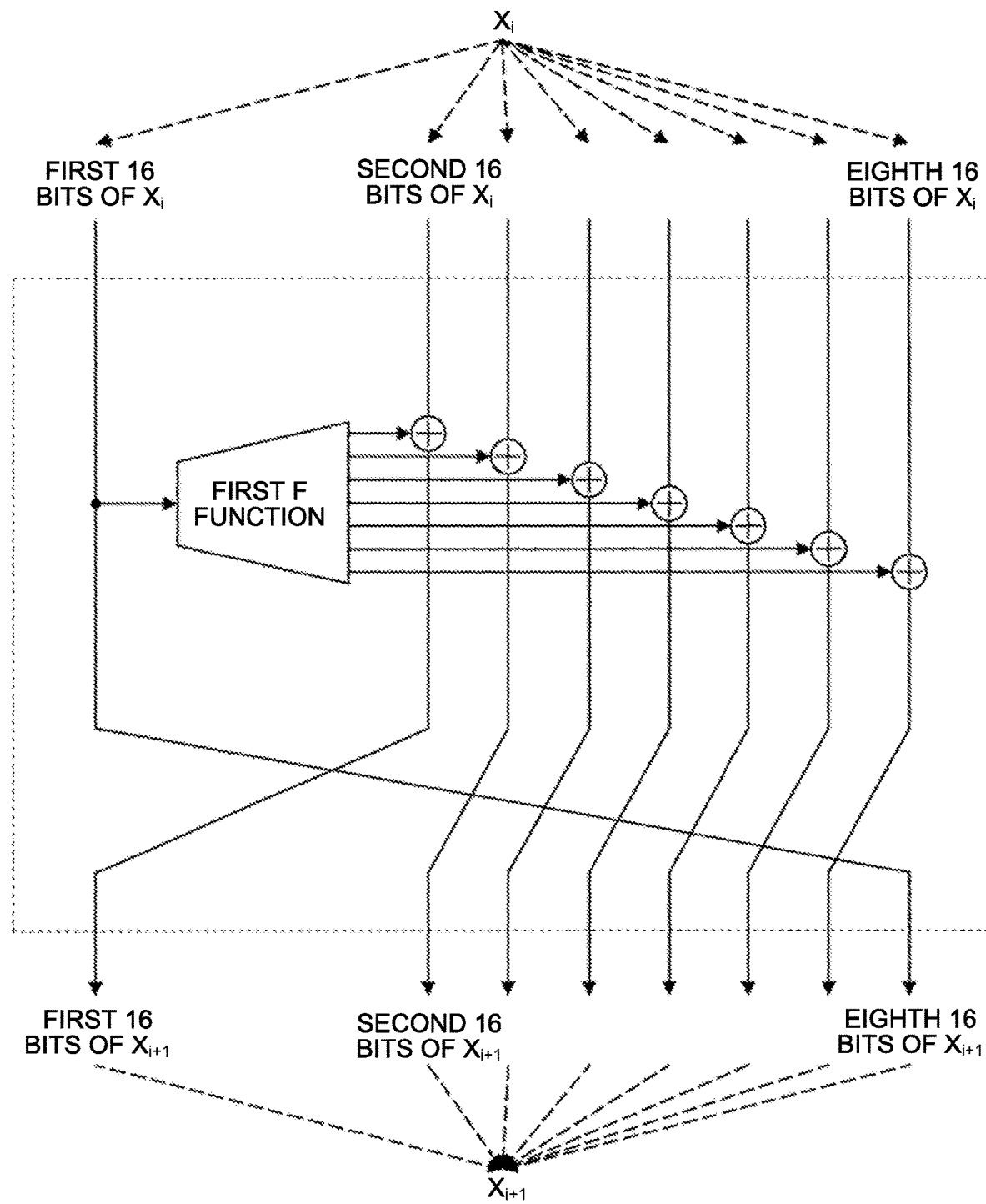
FIG. 16 is a schematic diagram illustrating the entire configuration in a case in which n=128, c=1, and d=8 in FIG. 10.
Figure 18:
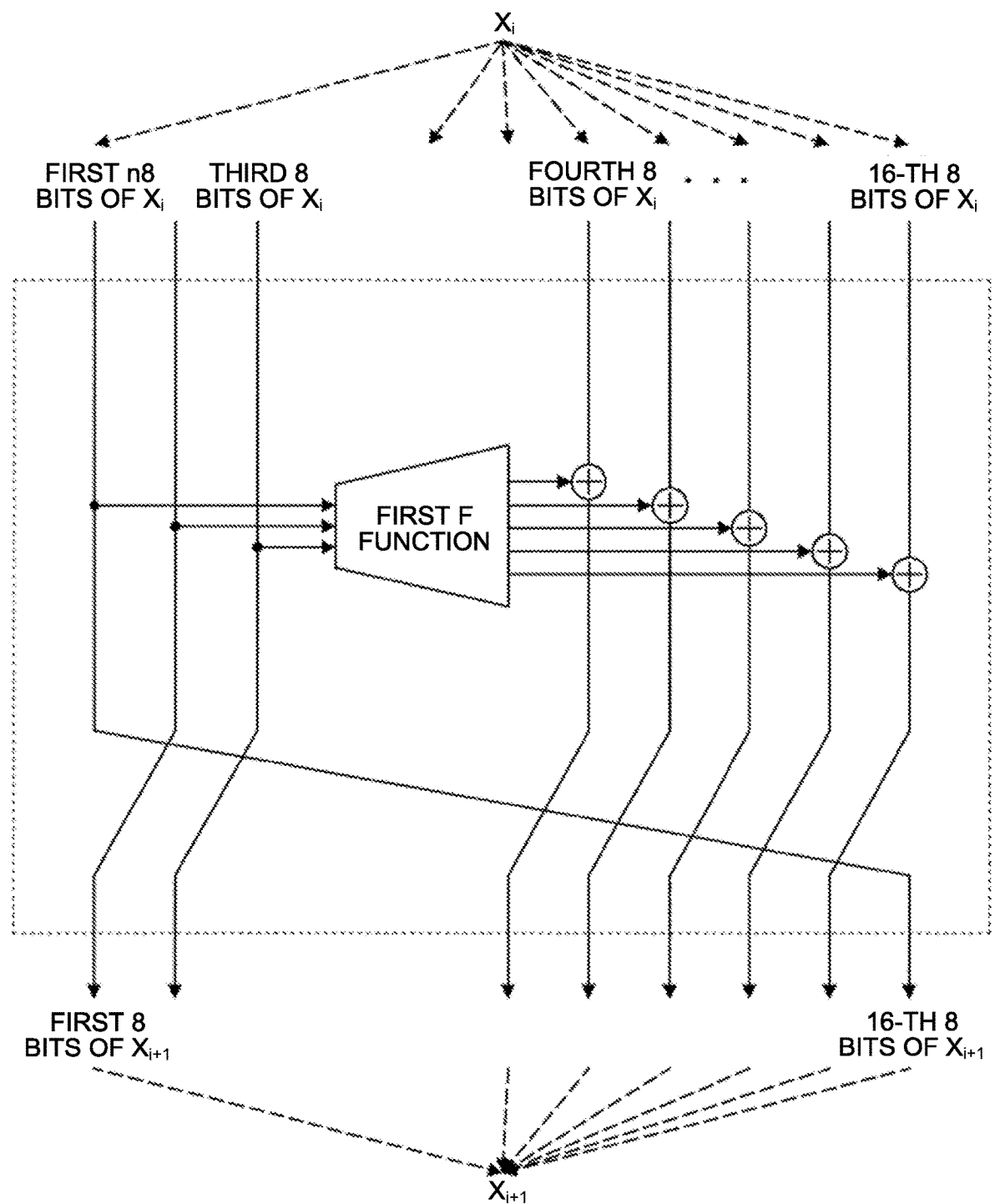
FIG. 18 is a schematic diagram illustrating the entire configuration in a case in which n=128, c=3, and d=16 in FIG. 10.

FIG. 14 to FIG. 18 are schematic diagrams illustrating specific configuration examples. FIG. 14 illustrates the entire configuration in a case in which n=n'=128, c=1, and d=16, and FIG. 15 illustrates the configuration of the F function in the example of FIG. 14. FIG. 16 illustrates a case in which n=128, c=1, and d=8, FIG. 17 illustrates a case in which n=128, c=1, and d=4, and FIG. 18 illustrates a case in which n=128, c=3, and d=16.

Figure 19:
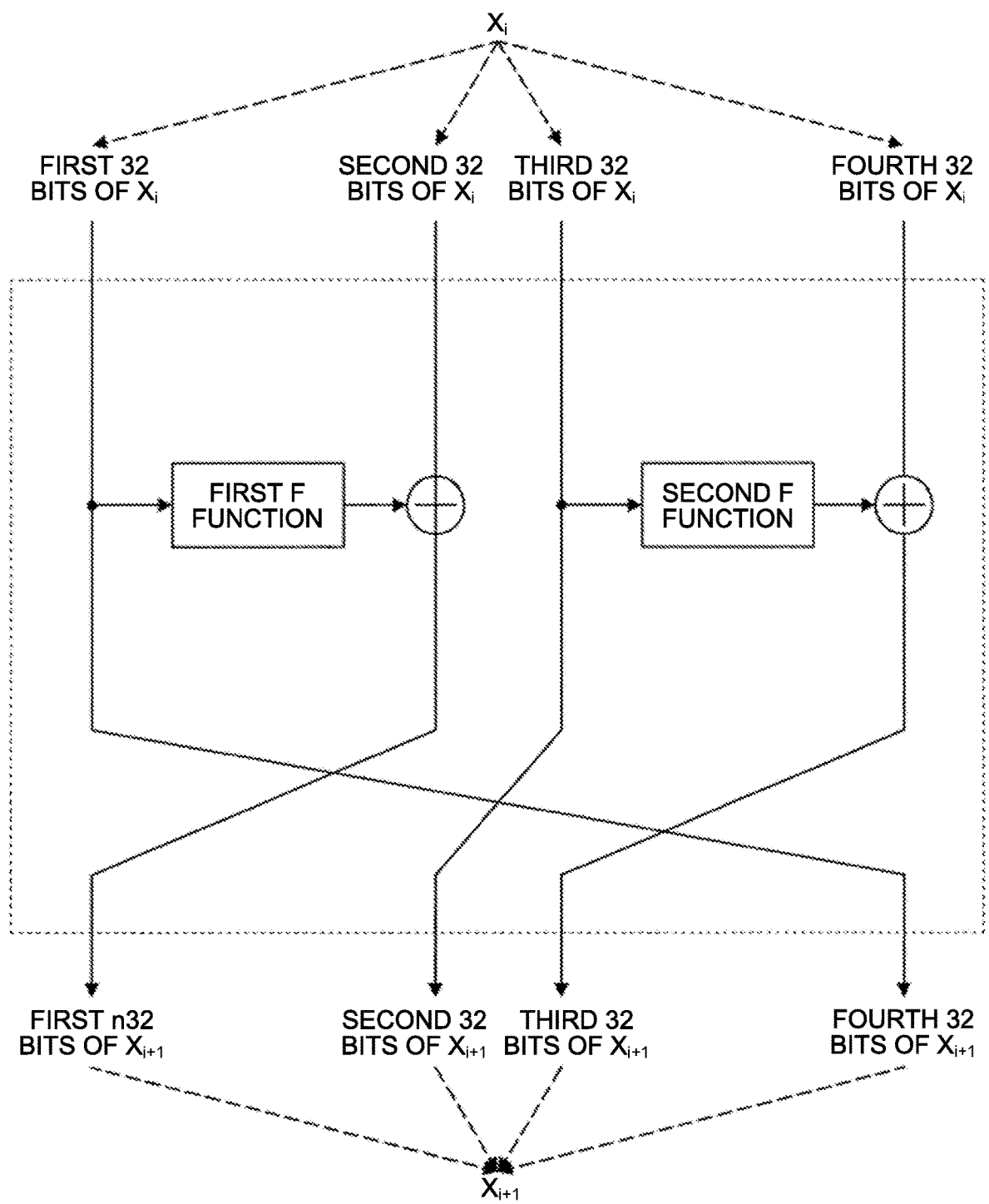
FIG. 19 is a schematic diagram illustrating an example in which there are two F functions in one round, and n=128 and d=4.

FIG. 19 is a schematic diagram illustrating an example in which there are two F functions in one round, and n=128 and d=4. In all of the examples described above, the F function is implemented as a table in the white-box implementation. In the examples of FIG. 14, FIG. 16, FIG. 17, and FIG. 18, the table size (the size of the F function) is about 3.84 [byte], 918 [Kbyte], 51.5 [Gbyte], and 218 [Mbyte], respectively.

4.2. Specific Example (C)

FIG. 20 is a schematic diagram illustrating the specific example (C), and illustrates a configuration example using the SPN structure. In the example illustrated in FIG. 20, the n-bit input data Xi is divided into d sorts of data, and the size of the data in each line is n/d [bit]. In this case, an arithmetic operation (non-linear transformation operation S-layer (Substitution-layer)) is performed using the S function with input/output of n/d [bit] for each piece of data. Thereafter, n-bit input/output linear transformation is performed as an arithmetic operation (linear transformation P-layer (Permutation-layer)) using the L function. In this case, the S function and the L function (input/output linear transformation L) are bijective functions, and the L function includes a round constant operation. The S function is configured based on the internal block cipher E', but needs to be the bijective function, so that the S function cannot be configured by transformation performed by fixing the input bits and disregarding part of the outputs for the internal block cipher E' as illustrated in FIG. 13. Thus, a block cipher of n/d [bit] needs to be used. Accordingly, a condition for the block size n' of the internal block cipher E' is n'=n/d (condition 2).

Figure 21:
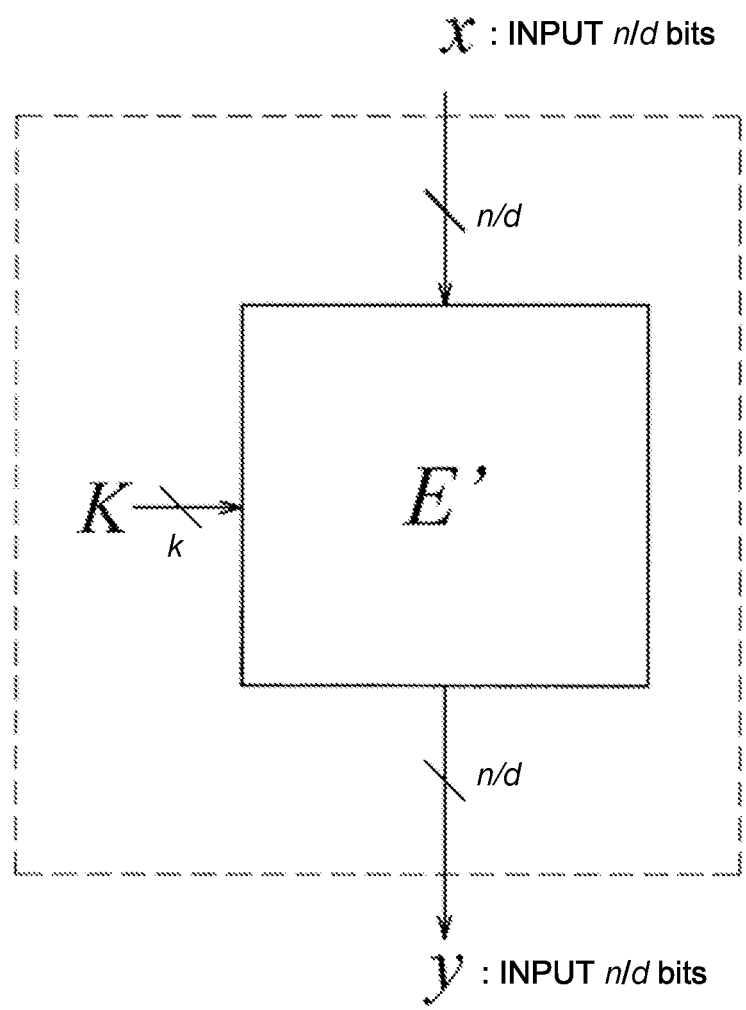
FIG. 21 is a schematic diagram illustrating a configuration of each of S functions illustrated in FIG. 18.

FIG. 21 is a schematic diagram illustrating a configuration of each of the S functions illustrated in FIG. 20. As illustrated in FIG. 21, the size of input/output of the internal block cipher E' constituting the S function is n/d [bit]. Thus, for example, in a case of 8-bit input/output, a table in which the input value (0 to 255) is associated with the output value is generated, and the arithmetic operation of the S function is performed with this table. The L function for performing a linear transformation operation is constituted of a square matrix, for example. In a case in which the input/output of the S function is 8 bits, the 8-bit output from the S function is input to the L function, a square matrix of 8×8 matrix is multiplied by an 8-bit value, and an 8-bit value is output from the L function. In this way, the L function has a function of diffusing the output value from the S function.

FIG. 22 is a schematic diagram illustrating a specific configuration example, and illustrates a case in which n=128 and d=8. The S function is implemented as a table in the white-box implementation. The table size in FIG. 22 is about 256 [byte]. Also in a case of the S function, similarly to the case of the F function illustrated in FIG. 13, a constant specific to the round can be XORed to the output of the S function to change each S function. Due to this, the S function itself can be shared, so that a memory region for storing the table can be largely reduced.

4.3. Specific Example (D)

Figure 23:
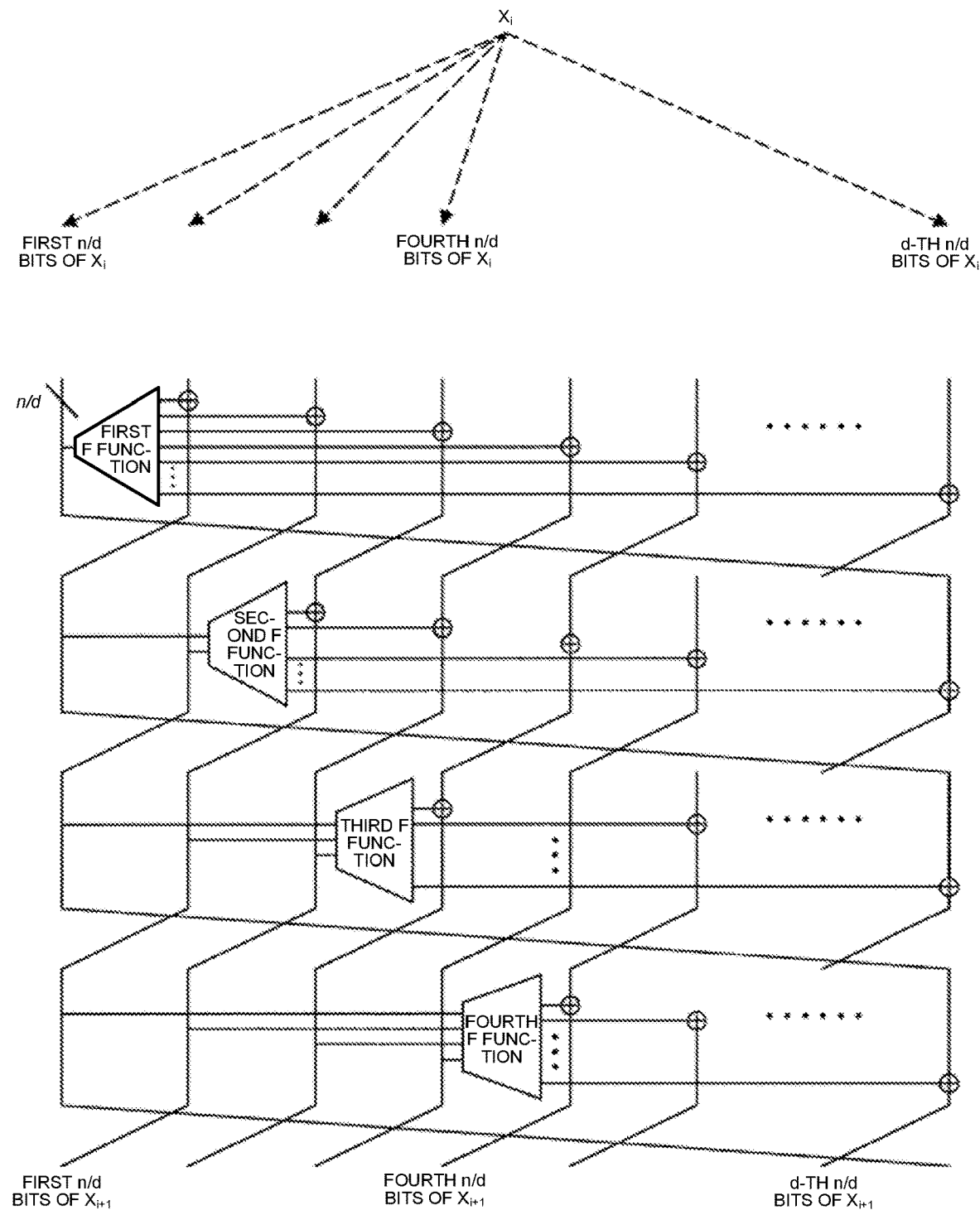
FIG. 23 is a schematic diagram illustrating the specific example (D).

FIG. 23 is a schematic diagram illustrating the specific example (D), and illustrates a configuration example using a modified Feistel structure. In the example illustrated in FIG. 23, the n-bit input data is divided into d sorts of data, and the size of the data in each line is n/d, and the data is constituted of four types of F functions having different sizes. The F function with the input of n/d [bit] and the output of (n−n/d) [bit] is used in the first round, the F function with the input of 2n/d [bit] and the output of (n−2n/d) [bit] is used in the second round, the F function with the input of 3n/d [bit] and the output of (n−3n/d) [bit] is used in the third round, and the F function with the input of 4n/d [bit] and the output of (n−4n/d) [bit] is used in the fourth round. These four rounds are bases, and optional rounds are repeated. Similarly to the method illustrated in FIG. 13, the F function having an optional size is generated from the internal block cipher E', and the round constant is XORed to the output.

In the white-box implementation, part or all of the functions are implemented as a table in accordance with a code (table size) desired by the user. In a case in which n=128 and d=16, the table size of the F function in each round is as follows: about 3.84 [byte] in the first round, 918 [Kbyte] in the second round, 218 [Mbyte] in the third round, and 51.5 [Gbyte] in the fourth round. By selecting the F function to be implemented as a table in accordance with a demand of the user, the entire code size can be adjusted. For example, by performing function operation each time without tabulating the fourth round function, the entire code size can be suppressed.

4.4. Specific Example (E)

Figure 24:
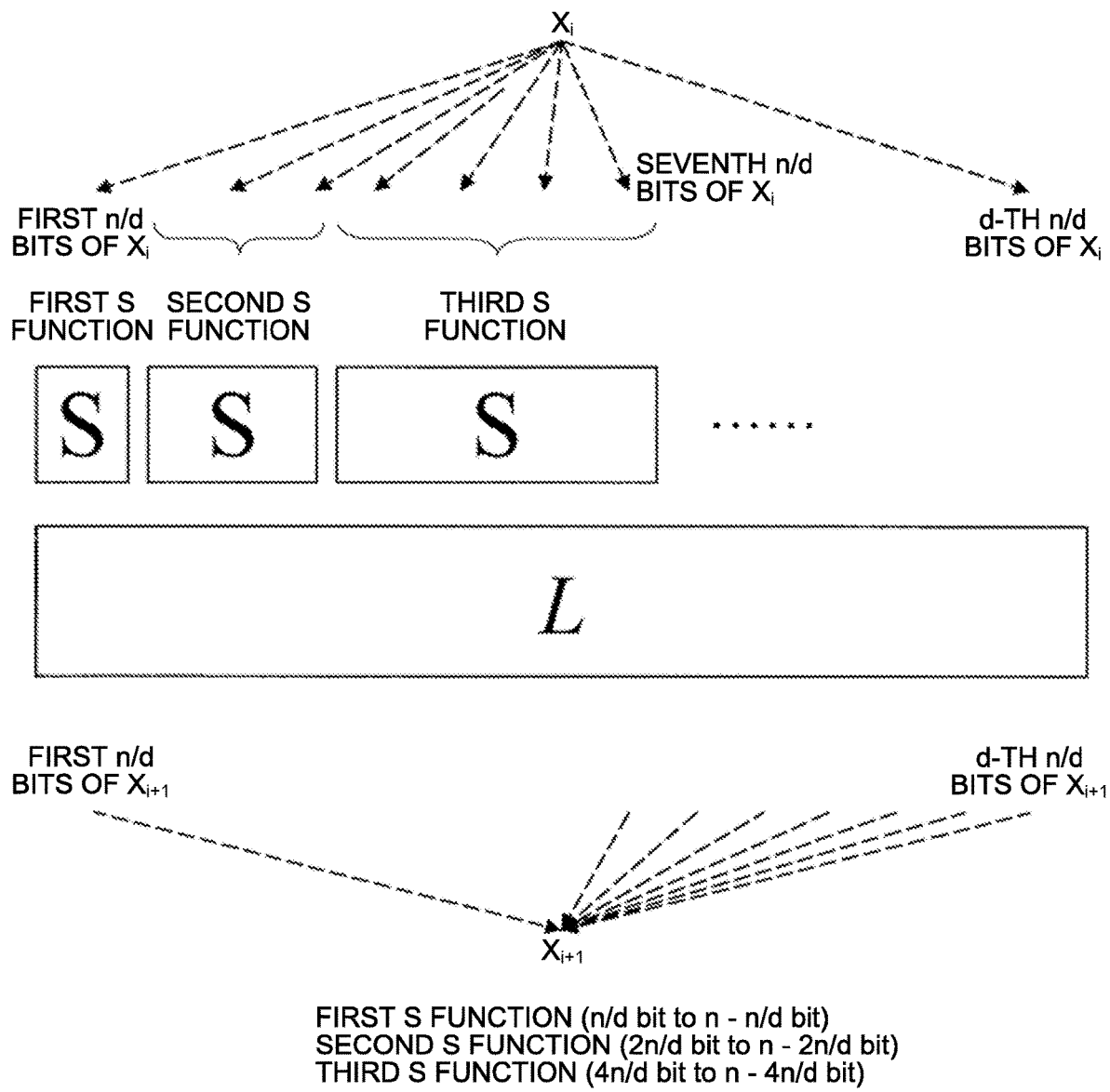
FIG. 24 is a schematic diagram illustrating the specific example (E).

FIG. 24 is a schematic diagram illustrating the specific example (E), and illustrates a configuration example using a modified SPN structure. In the example illustrated in FIG. 24, the n-bit input data is divided into d sorts of data, the size of the data in each line is n/d, and the data is constituted of three types of S functions having different sizes. As S-layers in respective rounds, the S function with input/output of n/d [bit], input/output of 2n/d [bit], and input/output of 4n/d [bit] are used. In the white-box implementation, part or all of the functions are implemented as a table in accordance with a code (table size) desired by the user. For example, it is assumed that pieces of data of 8 [bit], 16 [bit], and 32 [bit] are implemented where n=128 and d=8. The respective table sizes are 256 [byte], 132 [Kbyte], and 17.2 [Gbyte]. By selecting the S function to be implemented as a table in accordance with a demand of the user, the entire code size can be adjusted.

With the block cipher E according to the embodiment, in the white-box model, security against key extraction is concluded to be security against a key recovery problem in the black-box model of the internal block cipher E'. This is because the internal block cipher E' is implemented as a table in the white-box implementation, and the attacker can access only the input/output of the table even in the white model. This matches with the black-box model of the internal block cipher E'. By using a cipher having high reliability (for example, the AES) for an internal state (internal block cipher E'), the white-box model can also have security equivalent to that of key recovery in the black-box model of the internal block cipher E'.

Additionally, the attacker cannot reduce the table size unless knowing a key (Space-hardness). The attacker cannot calculate E' without using a table operation unless knowing information of the key of the internal block cipher E'. Thus, the given table cannot be converted into a smaller table. This means that, when the attacker makes a code lifting attack, large-volume data is required. A time required for extracting the code is increased in proportion to the data size, so that code lifting work takes a long time. Additionally, if the entire code is taken, the size thereof cannot be compressed and large-volume data is required to be sent in distributing the code, so that a risk of distribution can be reduced.

Regarding external encoding, the security can be guaranteed without external encoding.

Furthermore, tables of various sizes corresponding to implementation requirements can be configured. According to the specific example (B) and the specific example (C), an algorithm of an optional table size can be configured by changing the value of the number of divisions d. According to the specific example (D) and the specific example (E), a plurality of table sizes can be implemented with the same algorithm by appropriately selecting a plurality of values of the number of divisions d, or sizes of the F functions and the S functions to be used.

The user can freely select the internal block cipher E'. The internal block cipher E' can be freely selected as long as the condition for the input/output size (the condition 1, the condition 2) is satisfied. In a case of being used in the black box, table implementation is not required, and an internal arithmetic operation can be directly performed. In this case, it is possible to meet various implementation needs by appropriately selecting the internal block cipher E'. For example, by using the AES as the internal block cipher E' and using AES-NI, the internal block cipher E' can be implemented as software very rapidly, and can be implemented to be secure against a cache timing attack. By using Piccolo or Pride as software and a lightweight cipher, the internal block cipher E' can be implemented even in an environment in which implementation constraint such as a RAM size is large.

5. Configuration Example for Decryption

As described above, the decryption algorithm D corresponding to the encryption algorithm E can be defined as the inverse function $E^{-1}$ of the encryption algorithm E, receives the ciphertext C and the key K as an input, and outputs the plaintext P. Also in the decryption algorithm D, the security equivalent to that of the black-box model can be ensured by configuring the table by black-box implementation. Also in the encryption device 1000 illustrated in FIG. 7, the decryption algorithm D corresponding to the encryption algorithm E of the key generation part 1200 can be defined as the inverse function $E^{-1}$ of the encryption algorithm E. A decryption algorithm corresponding to an encryption algorithm G of the encryption part 1100 can also be defined as an inverse function $G^{-1}$ of the encryption algorithm G.

6. Difference from Existing Technique

The following describes differences between the technique related to the block cipher E according to the embodiment and the methods disclosed in Non Patent Literatures 1 and 2 described above (referred to as a first existing technique), the method disclosed in Non Patent Literature 3 (referred to as a second existing technique), and the method disclosed in Non Patent Literature 4 (referred to as a third existing technique).

6.1. Difference from First Existing Technique

The first existing technique is an existing method of implementing an algorithm such as the AES and the DES, and it has been known that the first existing technique is not a cipher technique for the white box and is not secure for the white-box model. Thus, the first existing technique is different from the technique of the block cipher E according to the embodiment in which the security for the white-box model is largely improved.

The block cipher E according to the embodiment indicates that the block cipher that is secure in the black-box model satisfies the security, and the internal block cipher E' can be freely selected as long as the condition for the input/output size (the condition 1, the condition 2) is satisfied.

Due to this, in the black-box implementation, the internal block cipher E' can be freely selected in accordance with an implementation environment and required security. For example, by using the AES as the internal block cipher E' and using AES-NI, the internal block cipher E' can be implemented as software very rapidly, and can be implemented to be secure against a cache timing attack. By using Piccolo or Pride as software and a lightweight cipher, the internal block cipher E' can be implemented even in an environment in which implementation constraint such as a RAM size is large. Although an ASASA structure is not secure in the white-box model, with the block cipher E according to the embodiment, the security can also be guaranteed for the white-box model.

6.2. Difference from Second and Third Existing Techniques

In the second existing technique, the cipher is designed to be secure in the white-box model, but it is difficult to guarantee strong security (indistinguishability) in a case in which part of the information is leaked, and it is not possible to guarantee that the information of the plaintext is not leaked from the encryption function. The third existing technique assumes that the cryptographic key of the encryption scheme that is secure in the black-box model is protected in the white-box model, but a random number is required to guarantee the security in the white-box model. However, the white-box model assumes that the attacker can freely control a random number source, so that the security is difficult to be guaranteed.

On the other hand, with the block cipher E according to the embodiment, strong security against recovery of the cryptographic key and the indistinguishability can be ensured without using the random number. Thus, the information of the cryptographic key or the information of the plaintext can be securely prevented from being leaked to the attacker.

7. Regarding Effect of Block Cipher E According to Embodiment

Figure 25:
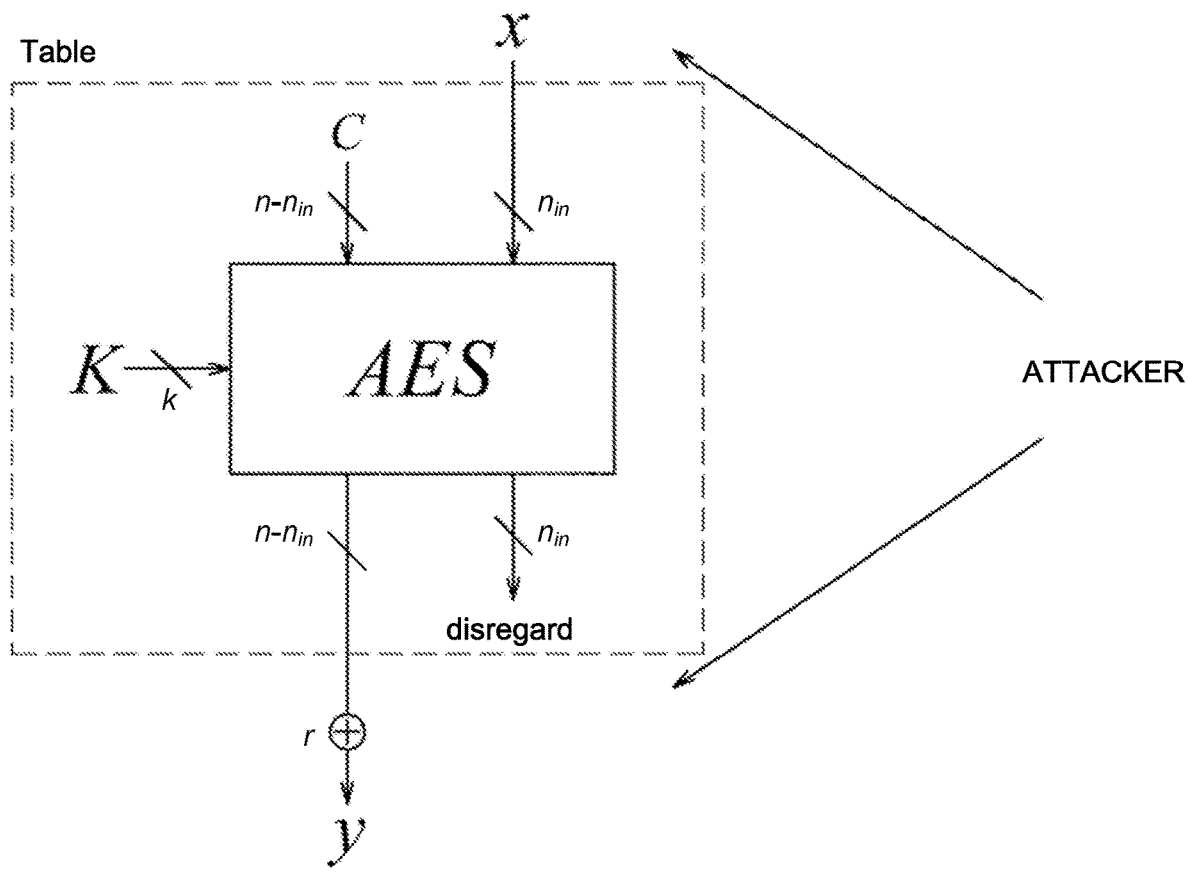
FIG. 25 is a schematic diagram for explaining security obtained by encryption according to the embodiment.

FIG. 25 is a schematic diagram for explaining the security obtained by encryption of the block cipher E according to the embodiment, and illustrates an example in which the F function based on the Feistel structure illustrated in FIG. 13 is configured with the AES. As described above, in the white-box model, the attacker can access the input/output of the table. The problem that the key is obtained from the same table as that in the black-box model of the internal block cipher E' (white-box model) is equivalent to a key recovery attack of the AES (black-box model). Thus, with encryption of the block cipher E according to the embodiment, the security equivalent to that for the key recovery attack of the AES (black-box model) can be ensured. In the white-box model, the security is concluded to be the security against a key recovery problem in the black-box model of the internal block cipher E'. The attacker cannot reduce the table size unless knowing the key (Space-hardness).

Figure 26:
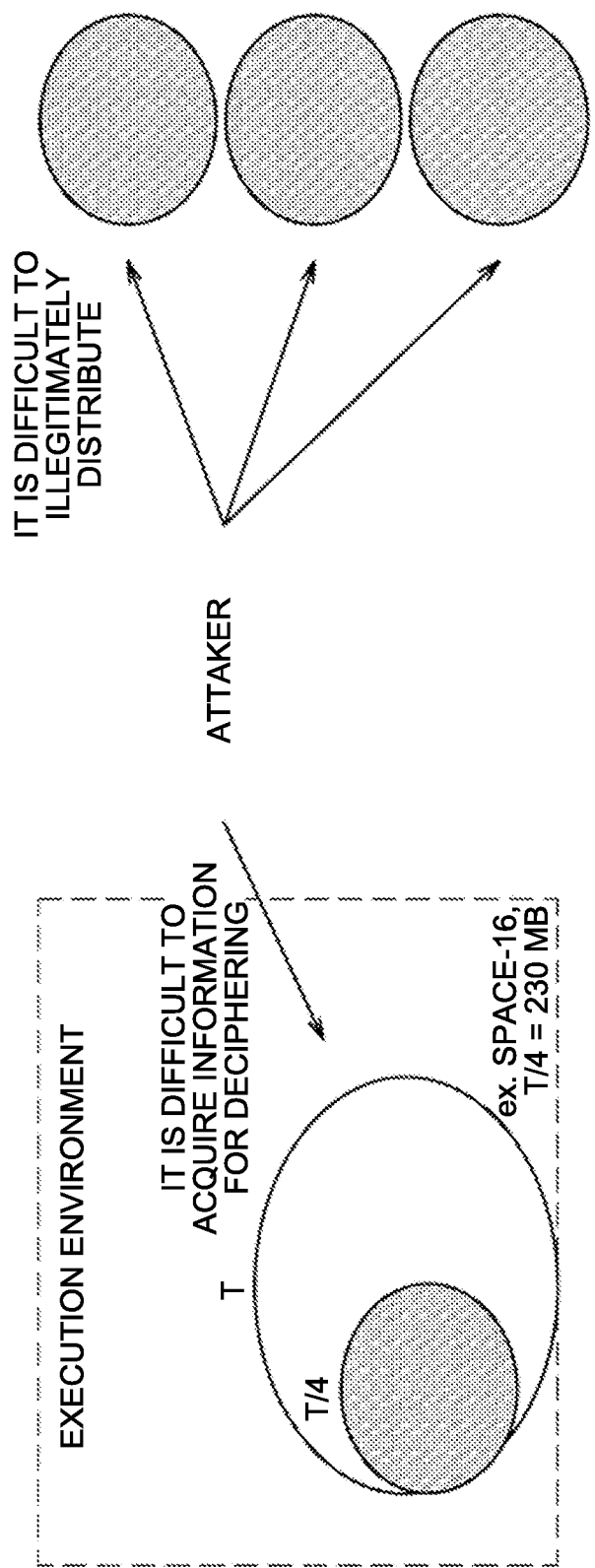
FIG. 26 is a schematic diagram for explaining security obtained by encryption according to the embodiment.

FIG. 26 is a schematic diagram for explaining the security obtained by encryption of the block cipher E according to the embodiment, and illustrates a data amount that is required at the time when the attacker makes an attack. For the attack, the secret key K cannot be acquired unless obtaining a very large amount of data. Specifically, the data amount needs to be $10^{4.4}$ to $10^{10.5}$ times larger than that for a 128-bit key. Even if the attacker can obtain the data, the data cannot be compressed, so that large-volume data can be a deterrent against illegitimate distribution.

With encryption of the block cipher E according to the embodiment, tables of various sizes corresponding to implementation requirements can be configured. With the configurations of the specific examples (B) and (C), an algorithm of an optional table size can be configured by changing the number of divisions d. With the configurations of the specific examples (D) and (E), a plurality of table sizes can be implemented with the same algorithm by appropriately selecting a plurality of values of the number of divisions d, or sizes of the F functions and the S functions to be used. Furthermore, the user can freely select an internal arithmetic operation for the table, and can select an optimum internal arithmetic operation for the black-box implementation.

8. Example of Application to which Embodiment is Applied

The technique related to the encryption device 1000 according to the embodiment can implement confidentiality of data in a communication channel as illustrated in FIG. 1, and can be applied to various applications. The following describes some examples of the application.

Figure 27:
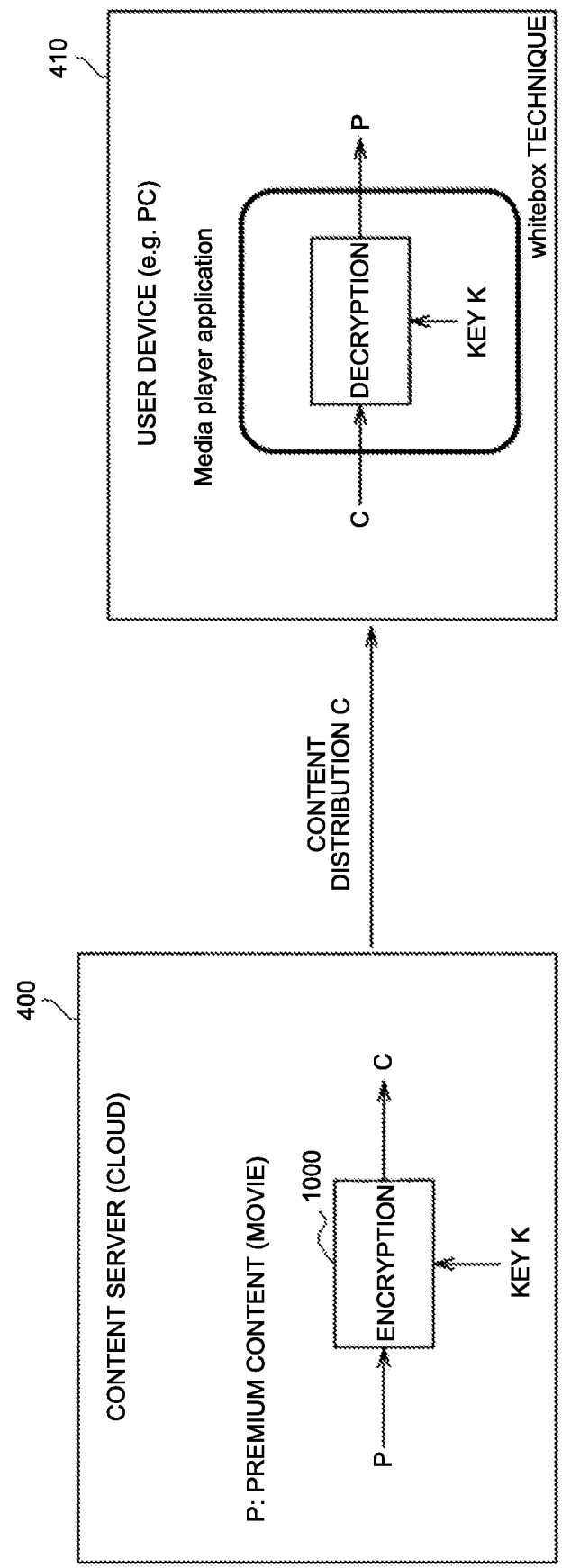
FIG. 27 is a schematic diagram illustrating an application example for Digital Rights Management (DRM).

FIG. 27 is a schematic diagram illustrating an application example for Digital Rights Management (DRM). As illustrated in FIG. 27, encryption is performed in a content server 400 on a cloud, and content (ciphertext C) is distributed to a user device 410 from the content server 400. The user device 410 is an electronic appliance such as a personal computer (PC) and a smartphone. The content (ciphertext C) is decrypted in the user device 410.

Figure 28:
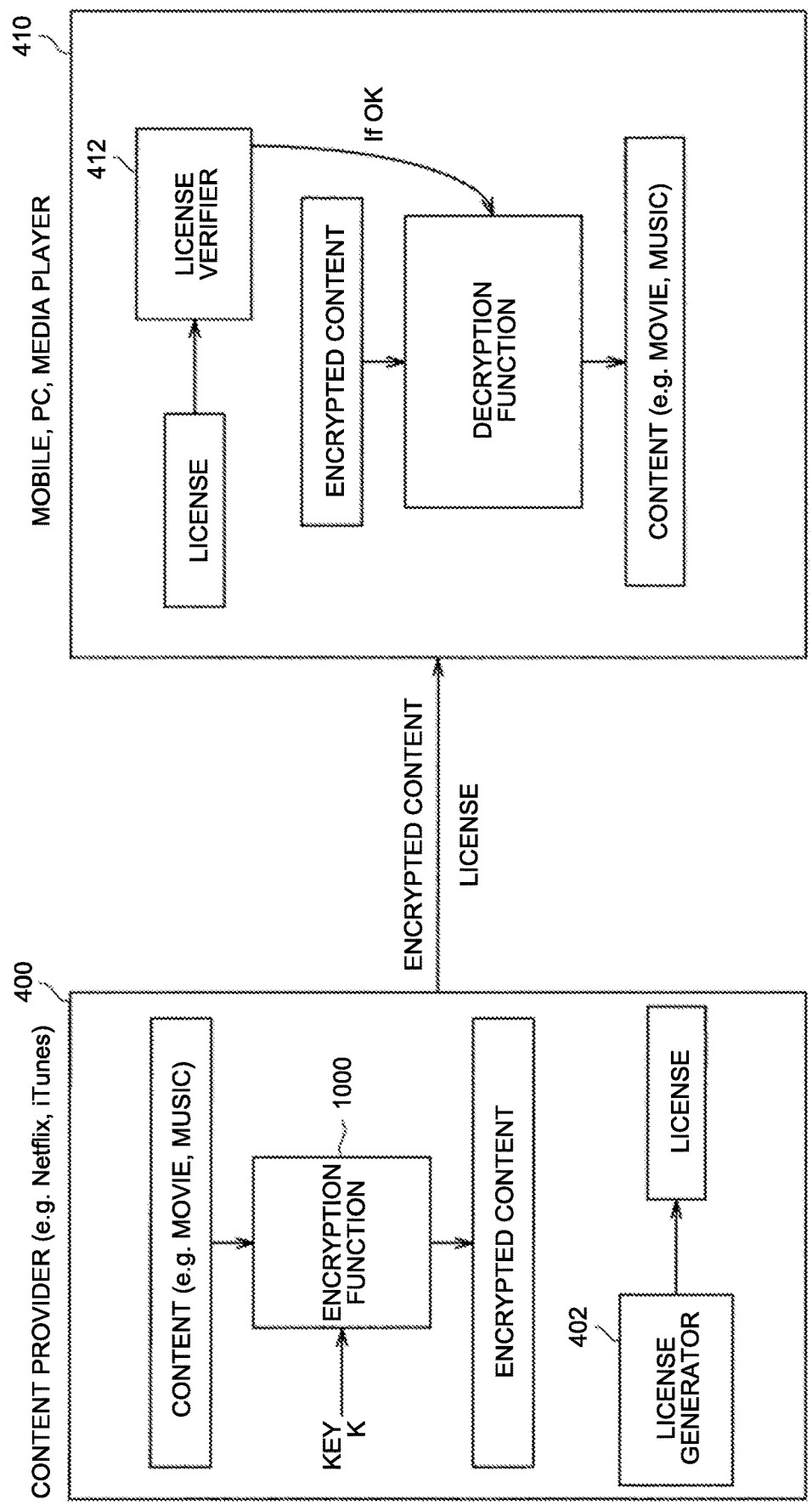
FIG. 28 is a schematic diagram illustrating FIG. 27 in more detail.

FIG. 28 is a schematic diagram illustrating FIG. 27 in more detail. The content server 400 encrypts content such as movies and music with a white box encryption function. In the content server 400, a license is generated by a license generator 402 to be transmitted to the user device 410 together with the encrypted content. The user device 410 verifies the transmitted license with a license verifier 412, and if the license is successfully verified, the user device 410 decrypts the encrypted content with a white-box decryption function.

In the Digital Rights Management as illustrated in FIG. 27 and FIG. 28, the content needs to be decrypted by the user device 410. In this case, if the key K is exposed, the content may be illegitimately distributed. That is, in an environment in which encryption is not secure, the user device 410 becomes an unreliable environment. According to the embodiment, it is possible to more securely prevent the secret key K of the content from being acquired by a malicious user with the white box encryption technique.

Figure 29:
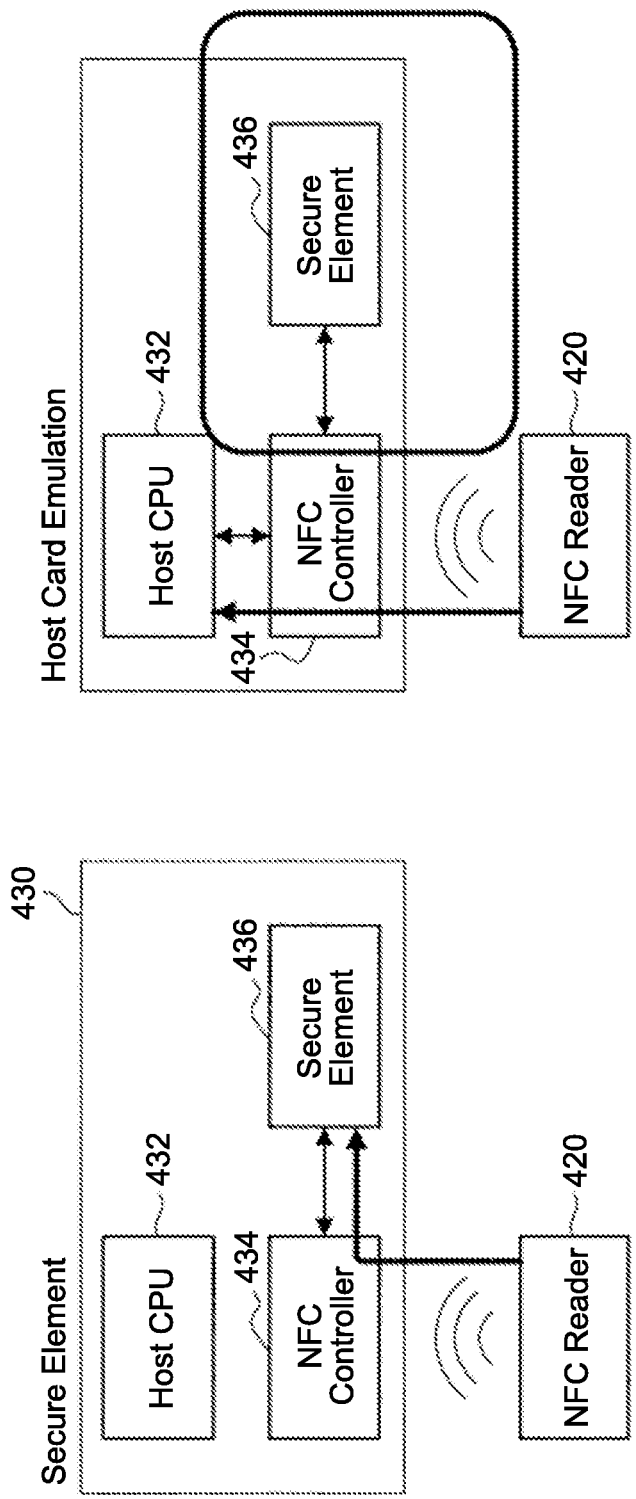
FIG. 29 is a schematic diagram illustrating an application example for a payment system utilizing emulation of NFC.

FIG. 29 is a schematic diagram illustrating an application example for a payment system utilizing emulation of NFC. As illustrated in FIG. 29, in this system, emulation is performed while bringing a user device 430 closer to a reading device 420 of NFC. The user device 430 includes a host CPU 432, an NFC controller 434, and a secure element 436.

Figure 30:
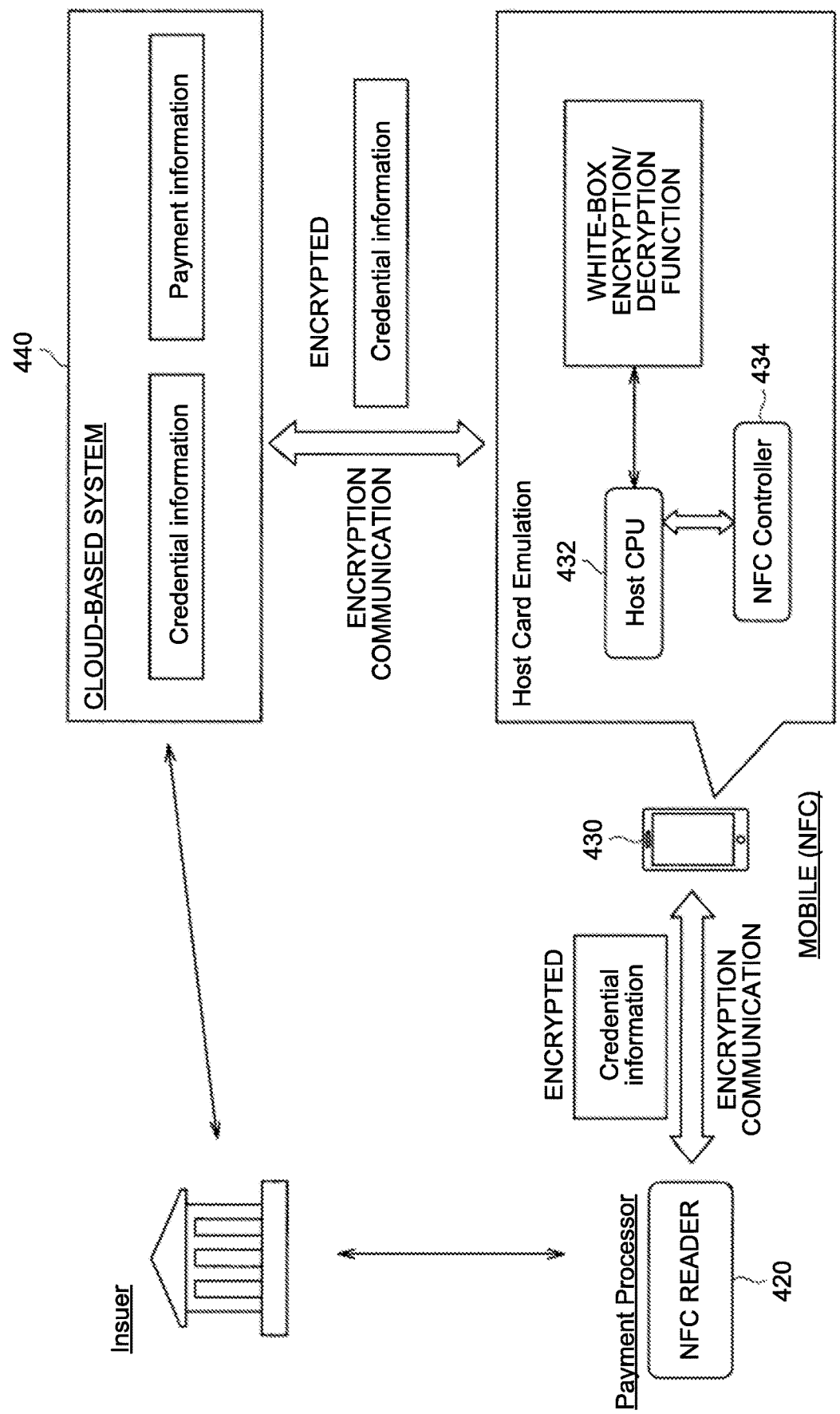
FIG. 30 is a schematic diagram illustrating FIG. 29 in more detail.

FIG. 30 is a schematic diagram illustrating FIG. 29 in more detail. A server 440 on a cloud includes information for certifying a user (Credential information) and Payment information. The user device 430 is an electronic appliance such as a mobile appliance, and performs encryption communication with the server 440 to exchange information for certification. The user device 430 also performs encryption communication with the reading device 420 to exchange the information for certification. In the encryption communication, encryption is performed by the encryption device 1000 according to the embodiment. Thus, the user device 430 has an encryption function and a decryption function. By performing encryption by the encryption device 1000, certification data related to payment can be protected. Due to this, even if the user device 430 does not include the secure element 436 as illustrated in the right diagram of FIG. 29, emulation of NFC is enabled to be performed.

Figure 31:
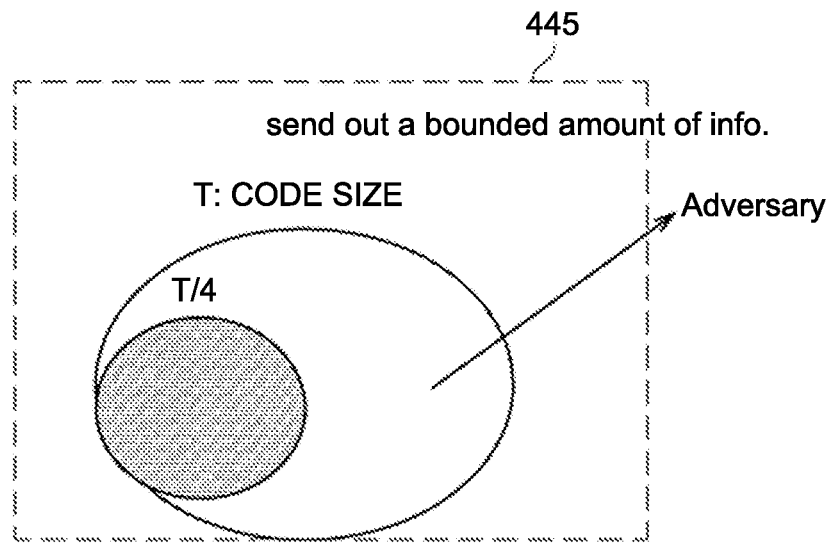
FIG. 31 is a schematic diagram illustrating a scheme that is secure against memory leak.

FIG. 31 is a schematic diagram illustrating a scheme that is also secure against memory leak. This system guarantees the security even in a case in which memory is leaked to the attacker due to vulnerability of software (buffer overflow, heart bleed), or malware. In a device 445 having vulnerability to malware or memory leak, the security is not lowered unless data of several kilobytes, several gigabytes, or more is leaked due to a property of Space hardness of the white-box encryption scheme. In the example of FIG. 31, assuming that the code size is T, the security is not lowered unless data of T/4 or more is leaked. Space hardness is a technique that can guarantee the security of the cipher unless memory of a certain size or more is leaked. This method is effective especially in a case in which communication traffic volume from an external network is limited by an internal network.

Figure 32:
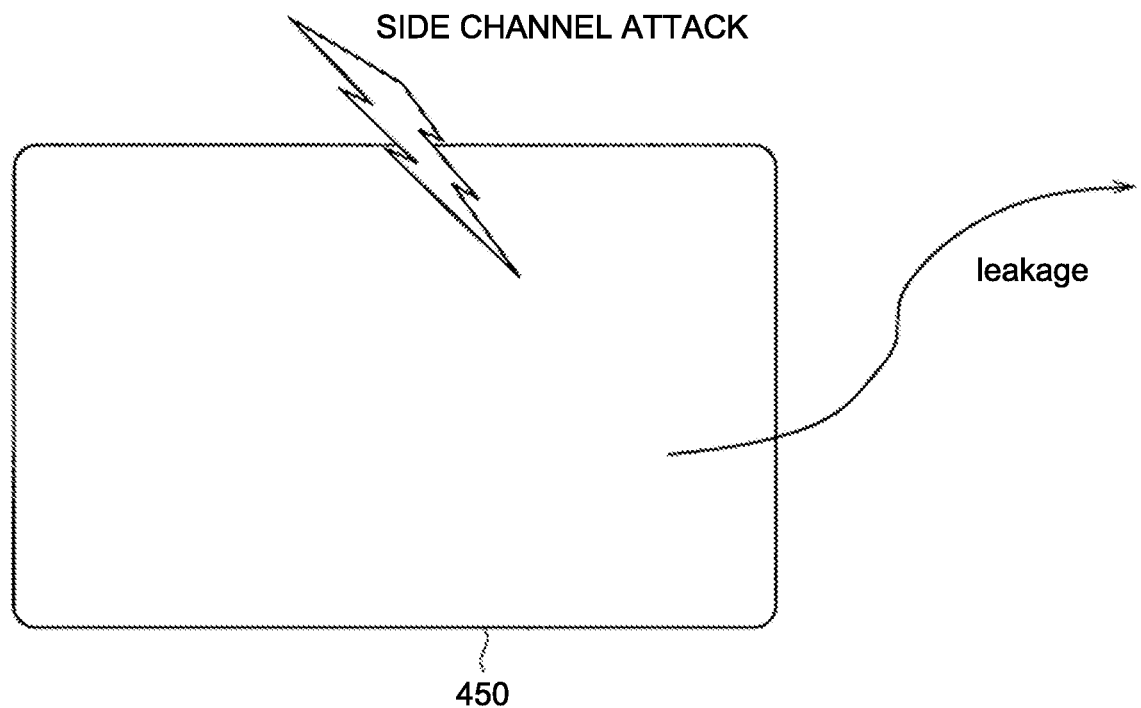
FIG. 32 is a schematic diagram illustrating an example of encryption that is secure against a side channel attack.

FIG. 32 is a schematic diagram illustrating an example of encryption that is secure against a side channel attack. The white-box encryption scheme is typically used for software, but can also be used for hardware as an encryption scheme that is secure against a side channel by being implemented using Reconfigurable Hardware (FPGA). For example, the encryption scheme is effective especially for a device that may be subjected to the side channel attack as hardware such as an IC card 450 illustrated in FIG. 32.

The preferred embodiment of the present disclosure has been described above in detail with reference to the attached drawings, but the technical scope of the present disclosure is not limited to such examples. A person ordinarily skilled in the art of the present disclosure can obviously conceive various examples of variations or modifications within a scope of technical idea described in CLAIMS, and it is obvious that these examples are also encompassed by the technical scope of the present disclosure.

The effects described in the present description are merely explanation or examples, and are not limitations. That is, the technique according to the present disclosure can exhibit another effect that is obvious to those skilled in the art from the description herein in addition to the effect described above, or in place of the effect described above.

The following configurations are also encompassed by the technical scope of the present disclosure.

(1)
An encryption device comprising:
an encryption part configured to encrypt an input value using a black-box model in which input/output values are able to be recognized from the outside and an intermediate value is not able to be recognized from the outside; and
a key generation part configured to encrypt the input value to the encryption part to generate a cryptographic key of the encryption part using a white-box model in which input/output values and the intermediate value are able to be recognized from the outside.

(2)
The encryption device according to (1), wherein
the key generation part comprises:
a data encryption part in which at least part of a plurality of round functions for successively performing encryption processing on the input value is tabulated to be encrypted using the white-box model in which the input/output values of the round function are able to be recognized from the outside, wherein
each of the round functions includes a tabulated encryption function for encrypting the input value using the black-box model in which the input/output value are able to be recognized from the outside and the intermediate value is not able to be recognized from the outside.

(3)
The encryption device according to (2), wherein
part of bits to be input to the round function is input to the encryption function, and
the encryption function causes part of bits that are able to be input to the encryption function to be a fixed value and disregards part of output values of the encryption function to output an output value of the number of bits corresponding to a difference between the number of bits that are able to be input to the encryption function and the number of bits input to the encryption function.

(4)
The encryption device according to (3), wherein the round function operates an exclusive OR of bits that are not input to the encryption function among the bits to be input to the round function and bits of the output value from the encryption function.

(5)
The encryption device according to (4), wherein the round function outputs a value of bits input to the encryption function and a value of bits obtained by the exclusive OR.

(6)
The encryption device according to (5), wherein the round function outputs the value of bits input to the encryption function as a lower-order bit than the value of bits obtained by the exclusive OR.

(7)
The encryption device according to any one of (2) to (6), wherein an exclusive OR of an output of the round function and a predetermined value determined in advance is operated, and an obtained value is caused to be an input to the next round function or an output of the data encryption part.

(8)
The encryption device according to (2), wherein one of the round functions includes a plurality of the encryption functions.

(9)
The encryption device according to any one of (3) to (8), wherein, among the round functions, a larger input value of bits is input to the encryption function for a round function at a later stage.

(10)
The encryption device according to (2), wherein
one of the round functions includes a plurality of the encryption functions,
bits to be input to the round function are divided to be input to the encryption functions,
the encryption functions perform a non-linear operation, and
the round function performs a linear transformation operation on a result of the non-linear operation performed by the encryption functions to be output.

(11)
The encryption device according to (10), wherein the number of bits to be input and the number of bits to be output are the same for each of the encryption functions.

(12)
The encryption device according to (10) or (11), wherein the numbers of bits to be input to the respective encryption functions are different.

(13)
The encryption device according to any one of (2) to (12), wherein the encryption function performs encryption with an extended key that is generated from a secret key corresponding to the data encryption part.

(14)
An encryption method comprising:
encrypting an input value using a cryptographic key in a black-box model in which input/output values are able to be recognized from the outside and an intermediate value is not able to be recognized from the outside; and
encrypting the input value to generate the cryptographic key using a white-box model in which the input/output value and the intermediate value are able to be recognized from the outside.

(15)
A decryption device configured to perform decryption by an inverse operation of encryption processing, the encryption processing performed by an encryption part configured to encrypt an input value using a black-box model in which input/output values are able to be recognized from the outside and an intermediate value is not able to be recognized from the outside, and a key generation part configured to encrypt the input value to the encryption part to generate a cryptographic key of the encryption part using a white-box model in which the input/output value and the intermediate value are able to be recognized from the outside.

(16)
A decryption method for performing decryption by an inverse operation of encryption processing, the encryption processing comprising: encrypting an input value using a cryptographic key in a black-box model in which input/output values are able to be recognized from the outside and an intermediate value is not able to be recognized from the outside; and encrypting the input value to generate the cryptographic key using a white-box model in which the input/output value and the intermediate value are able to be recognized from the outside.

REFERENCE SIGNS LIST

100 DATA ENCRYPTION PART
300 TABLE
1100 ENCRYPTION PART
1200 KEY GENERATION PART

The invention claimed is:
1. An encryption device comprising:
an encryption part configured to receive an input value using a black-box model in which input/output values are able to be recognized from outside the black-box model and an intermediate value is not able to be recognized from the outside; and
a key generation part configured to encrypt the input value to generate a cryptographic key using a white-box model in which the input/output values and the intermediate value are able to be recognized from the outside, wherein
the encryption part is further configured to encrypt, based on the cryptographic key, the input value received using the black-box model, and
the key generation part and the encryption part are each implemented via at least one processor.

2. The encryption device according to claim 1, wherein the key generation part comprises:
a data encryption part in which at least part of a plurality of round functions for successively performing encryption processing on the input value is tabulated to be encrypted using the white-box model in which the input/output values of the round function are able to be recognized from the outside, wherein
each of the round functions includes a tabulated encryption function for encrypting the input value using the black-box model in which the input/output values are able to be recognized from the outside and the intermediate value is not able to be recognized from the outside, and
the data encryption part is implemented via at least one processor.

3. The encryption device according to claim 2, wherein part of bits to be input to the round function is input to the encryption function, and
the encryption function causes part of bits that are able to be input to the encryption function to be a fixed value and disregards part of output values of the encryption function to output an output value of a number of bits corresponding to a difference between a number of bits that are able to be input to the encryption function and a number of bits input to the encryption function.

4. The encryption device according to claim 3, wherein the round function operates an exclusive OR of bits that are not input to the encryption function among the bits to be input to the round function and bits of the output value from the encryption function.

5. The encryption device according to claim 4, wherein the round function outputs a value of bits input to the encryption function and a value of bits obtained by the exclusive OR.

6. The encryption device according to claim 5, wherein the round function outputs the value of bits input to the encryption function as a lower-order bit than the value of bits obtained by the exclusive OR.

7. The encryption device according to claim 2, wherein an exclusive OR of an output of the round function and a predetermined value determined in advance is operated, and an obtained value is caused to be an input to the next round function or an output of the data encryption part.

8. The encryption device according to claim 2, wherein one of the round functions includes a plurality of the encryption functions.

9. The encryption device according to claim 3, wherein, among the round functions, a larger input value of bits is input to the encryption function for a round function at a later stage.

10. The encryption device according to claim 2, wherein one of the round functions includes a plurality of the encryption functions,
bits to be input to the round function are divided to be input to the encryption functions,
the encryption functions perform a non-linear operation, and
the round function performs a linear transformation operation on a result of the non-linear operation performed by the encryption functions to be output.

11. The encryption device according to claim 10, wherein a number of bits to be input and a number of bits to be output are same for each of the encryption functions.

12. The encryption device according to claim 10, wherein the numbers of bits to be input to respective encryption functions are different.

13. The encryption device according to claim 2, wherein the encryption function performs encryption with an extended key that is generated from a secret key corresponding to the data encryption part.

14. An encryption method comprising:
receiving an input value using a black-box model in which input/output values are able to be recognized from outside the black-box model and an intermediate value is not able to be recognized from the outside;
encrypting the input value to generate a cryptographic key using a white-box model in which the input/output value and the intermediate value are able to be recognized from the outside; and
encrypting, based on the cryptographic key, the input value received using the black-box model.

15. A decryption device configured to perform decryption by an inverse operation of encryption processing, the encryption processing performed by an encryption part configured to receive an input value using a black-box model in which input/output values are able to be recognized from outside the black-box model and an intermediate value is not able to be recognized from the outside, and a key generation part configured to encrypt the input value to generate a cryptographic key using a white-box model in which the input/output value and the intermediate value are able to be recognized from the outside, wherein
the encryption part is further configured to encrypt, based on the cryptographic key, the input value received using the black-box model, and
the key generation part and the encryption part are each implemented via at least one processor.

16. A decryption method for performing decryption by an inverse operation of encryption processing, the encryption processing comprising: receiving an input value using a black-box model in which input/output values are able to be recognized from outside the black-box model and an intermediate value is not able to be recognized from the outside; encrypting the input value to generate a cryptographic key using a white-box model in which the input/output value and the intermediate value are able to be recognized from the outside; and encrypting, based on the cryptographic key, the input value received using the black-box model.

* * * * *